US011924815B2

(12) United States Patent
Ji et al.

(10) Patent No.: US 11,924,815 B2
(45) Date of Patent: Mar. 5, 2024

(54) BANDWIDTH RECOURSE SWITCHING METHOD, TERMINAL, AND NETWORK DEVICE FOR INDICATING BANDWIDTH RESOURCE SWITCHING

(71) Applicant: Huawei Technologies Co., Ltd., Shenzhen (CN)

(72) Inventors: Liuliu Ji, Shanghai (CN); Junchao Li, Shanghai (CN); Xiaoyan Bi, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 455 days.

(21) Appl. No.: 17/172,919

(22) Filed: Feb. 10, 2021

(65) Prior Publication Data

US 2021/0204288 A1 Jul. 1, 2021

Related U.S. Application Data

(63) Continuation of application No. PCT/CN2019/099698, filed on Aug. 8, 2019.

(30) Foreign Application Priority Data

Aug. 10, 2018 (CN) .......................... 201810910947.8
Mar. 29, 2019 (CN) .......................... 201910252616.0

(51) Int. Cl.
*H04W 72/04* (2023.01)
*H04L 5/00* (2006.01)
(Continued)

(52) U.S. Cl.
CPC ....... *H04W 72/0453* (2013.01); *H04L 5/0094* (2013.01); *H04L 27/26025* (2021.01); *H04W 72/23* (2023.01)

(58) Field of Classification Search
CPC ............. H04W 72/0453; H04W 72/23; H04W 72/046; H04L 27/26025; H04L 5/0094; H04L 5/06; H04L 5/26
See application file for complete search history.

(56) References Cited

U.S. PATENT DOCUMENTS 8,542,605 B2 * 9/2013 Chen ................. H04W 72/0453
370/252
2012/0269146 A1 10/2012 Pajukoski et al.
(Continued)

FOREIGN PATENT DOCUMENTS

CN 102083223 A 6/2011
CN 103298119 A 9/2013
(Continued)

OTHER PUBLICATIONS

NPL document, "Discussion on the impact of bandwidth parts in MN/SN coordination" Reno, USA, Nov. 27-Dec. 1, 2017 (Year: 2017).*
(Continued)

*Primary Examiner* — Mewale A Ambaye
(74) *Attorney, Agent, or Firm* — Leydig, Voit & Mayer, Ltd.

(57) ABSTRACT

A bandwidth resource switching method and apparatus are provided. When a network device sends bandwidth resource indication information to a terminal by using downlink control information, the network device may impose some constraints on uplink transmission mode-related configuration information or SRS-related configuration information on an indicated bandwidth resource, and other indication information carried in the downlink control information, so that no ambiguity occurs when the terminal parses the bandwidth resource indication information. Alternatively, when a side of a terminal receives bandwidth resource indication information sent by a network device by using
(Continued)

downlink control information, the terminal parses, in an unambiguous interpretation manner, configuration information on a bandwidth resource indicated by the bandwidth resource indication information in the downlink control information. According to the application, a BWP is smoothly switched to perform uplink transmission, uplink transmission efficiency can be improved, and system robustness can be improved.

12 Claims, 7 Drawing Sheets

(51) Int. Cl.
*H04L 27/26* (2006.01)
*H04W 72/0453* (2023.01)
*H04W 72/23* (2023.01)

(56) References Cited

U.S. PATENT DOCUMENTS

| | | | |
|---|---|---|---|
| 2016/0014778 A1* | 1/2016 | Zhou | H04L 41/0803 370/252 |
| 2018/0183551 A1 | 6/2018 | Chou et al. | |
| 2021/0007139 A1* | 1/2021 | Fu | H04L 41/0896 |
| 2022/0210832 A1* | 6/2022 | Shen | H04W 72/0453 |
| 2022/0394601 A1* | 12/2022 | Zhang | H04L 1/08 |
| 2023/0025011 A1* | 1/2023 | Yao | H04W 72/0453 |
| 2023/0034639 A1* | 2/2023 | Sakhnini | H04L 5/0053 |

FOREIGN PATENT DOCUMENTS

| | | | | |
|---|---|---|---|---|
| CN | 105450374 A | 3/2016 | | |
| CN | 107872891 A | 4/2018 | | |
| CN | 109588058 A | 4/2019 | | |
| KR | 20180081464 A | 7/2018 | | |
| WO | 2014163302 A1 | 10/2014 | | |
| WO | 2016029690 A1 | 3/2016 | | |
| WO | WO-2016029690 A1 * | 3/2016 | | H04L 1/0003 |
| WO | 2017209478 A1 | 12/2017 | | |
| WO | 2018112932 A1 | 6/2018 | | |

OTHER PUBLICATIONS

"Discussion on the impact of bandwidth parts in MN/SN coordination," 3GPP TSG-RAN WG2 Meeting #100, Reno, USA, R2-1713567, Total 4 pages, 3rd Generation Partnership Project, Valbonne, France (Nov. 27-Dec. 1, 2017).

"Clarification for initial BWP ID configuration for DCI indication (RIL Q319 Q320)," 3GPP TSG-RAN WG2 Meeting #101, Athens, Greece, R2-1803768, Total 4 pages, 3rd Generation Partnership Project, Valbonne, France (Feb. 26-Mar. 2, 2018).

Huawei, HiSilicon, "Remaining issues on bandwidth part," 3GPP TSG RAN WG1 Meeting #90bis, Prague, Czech Republic, R1-1717077, total 11 pages, 3rd Generation Partnership Project, Valbonne, France (Oct. 9-13, 2017).

"3rd Generation Partnership Project; Technical Specification Group Radio Access Network; NR;Physical channels and modulation (Release 15)," 3GPP TS 38.211 V15.2.0, total 96 pages, 3rd Generation Partnership Project, Valbonne, France (Jun. 2018).

"3rd Generation Partnership Project; Technical Specification Group Radio Access Network; NR;Multiplexing and channel coding (Release 15)," 3GPP TS 38.212 V15.2.0, total 98 pages, 3rd Generation Partnership Project, Valbonne, France (Jun. 2018).

"3rd Generation Partnership Project; Technical Specification Group Radio Access Network; NR;Physical layer procedures for control (Release 15)," 3GPP TS 38.213 V15.2.0, total 99 pages, 3rd Generation Partnership Project, Valbonne, France (Jun. 2018).

"3rd Generation Partnership Project; Technical Specification Group Radio Access Network; NR; Physical layer procedures for data (Release 15)," 3GPP TS 38.214 V15.2.0, 94 pages, 3rd Generation Partnership Project, Valbonne, France (Jun. 2018).

"3rd Generation Partnership Project; Technical Specification Group Radio Access Network;NR;Radio Resource Control (RRC) protocol specification (Release 15)," 3GPP TS 38.331 V15.2.1, total 303 pages, 3rd Generation Partnership Project, Valbonne, France (Jun. 2018).

Huawei, HiSilicon, "On bandwidth adaptation," 3GPP TSG RAN WG1 NR Ad-Hoc Meeting, Qingdao, China, R1-1711424, Total 5 pages, 3rd Generation Partnership Project, Valbonne, France (Jun. 27-30, 2017).

Qualcomm Incorporated, "Remaining Issues on BWP," 3GPP TSG RAN WG1 Meeting #92, Athens, Greece, R1-1802844, Total 24 pages, 3rd Generation Partnership Project, Valbonne, France (Feb. 26-Mar. 2, 2018).

201910252616.0, Office Action and Search Report, dated Jul. 28, 2023.

* cited by examiner

BANDWIDTH RECOURSE SWITCHING METHOD, TERMINAL, AND NETWORK DEVICE FOR INDICATING BANDWIDTH RESOURCE SWITCHING

CROSS-REFERENCE TO RELATED APPLICATIONS

This application is a continuation of International Application No. PCT/CN2019/099698, filed on Aug. 8, 2019, which claims priority to Chinese Patent Application No. 201910252616.0, filed on Mar. 29, 2019 and Chinese Patent Application No. 201810910947.4, filed on Aug. 10, 2018. All of the aforementioned patent applications are hereby incorporated by reference in their entireties.

TECHNICAL FIELD

Embodiments of this application relates to the field of communications technologies, and in particular, to a bandwidth resource switching method, a method for indicating bandwidth resource switching, a terminal, and a network device.

BACKGROUND

As a next-generation wireless communications standard, in a new radio (NR) technology, a manner in which a network device allocates a frequency resource (which may also be referred to as a frequency domain resource) to a terminal is as follows: The network device configures a bandwidth resource for the terminal from a system frequency resource, the network device schedules the terminal on the configured bandwidth resource, and a part of or all of resources in the configured bandwidth resource may be allocated to the terminal for communication between the network device and the terminal.

As shown in FIG. 1, the system frequency resource is also referred to as a carrier bandwidth, and includes at least one bandwidth resource. In this specification, the bandwidth resource is also referred to as a bandwidth part (BWP). The bandwidth resource and the bandwidth part have a same meaning and can be interchanged. The bandwidth part may be some consecutive or inconsecutive resources in the system frequency resource, or may be all resources in the system frequency resource. Each bandwidth part includes at least one consecutive subband or frequency domain resource block, and each subband or frequency domain resource block further includes a plurality of consecutive subcarriers.

Each bandwidth part may correspond to a group of numerologies, including but not limited to, for example, a subcarrier spacing and a cyclic prefix (CP). Different bandwidth parts may correspond to different numerologies. Optionally, within a same transmission time interval (TTI), in a plurality of bandwidth parts, only one bandwidth part may be available and other bandwidth parts are unavailable. The bandwidth part is available means that a communication process mainly occurs in the bandwidth part. Alternatively, a plurality of bandwidth parts may be available, and other bandwidth parts are unavailable. In the unavailable bandwidth part, usually, neither data sending nor data receiving is performed, but a measurement process of radio resource management may be performed.

The BWPs may further be classified into a downlink BWP and an uplink BWP. The downlink BWP is used in a downlink communication process, and is mainly used to transmit a downlink signal and a downlink channel. The uplink BWP is used in an uplink communication process, and is mainly used to transmit an uplink signal and an uplink channel.

In a system communication process, a scheduling manner in which the network device schedules a bandwidth resource for the terminal based on frequency domain selectivity is a common scheduling manner. The network device may select a BWP having a relatively good channel condition to communicate with the terminal. Therefore, in addition to a current active BWP, there may further be a BWP having a better channel condition. In this case, the network device expects to flexibly switch the current active BWP of the terminal.

However, when BWP information indicated by the network device to the terminal is different from information about the current active BWP, how the terminal performs uplink transmission is a technical problem that needs to be urgently resolved.

SUMMARY

In view of this, it is necessary to provide a method for indicating bandwidth resource switching. Bandwidth resource indication information is sent to a terminal, to guide the terminal to smoothly switch a BWP based on the bandwidth resource indication information.

In addition, a bandwidth resource switching method is provided. A BWP is switched and uplink transmission is performed based on bandwidth resource indication information and an uplink transmission mode configuration status or a sounding reference signal configuration status on an indicated bandwidth resource.

In addition, a network device is provided. The network device sends bandwidth resource indication information to a terminal, to guide the terminal to smoothly switch a BWP based on the bandwidth resource indication information.

In addition, a terminal is provided. A BWP may be switched and uplink transmission may be performed based on bandwidth resource indication information received by the terminal and an uplink transmission mode configuration status or a sounding reference signal configuration status on an indicated bandwidth resource.

According to a first aspect of embodiments of the present invention, a method for indicating bandwidth resource switching is provided. The method includes:
  sending, by a network device, bandwidth resource configuration information to a terminal, where the bandwidth resource configuration information carries an initial bandwidth resource or a first active bandwidth resource; and
  sending, by the network device, downlink control information to the terminal, where the downlink control information carries bandwidth resource indication information, and the bandwidth resource indication information is used to indicate an identifier of a bandwidth resource, to indicate the terminal to perform a bandwidth resource switching operation.

According to a second aspect of the embodiments of the present invention, a bandwidth resource switching method is provided. The method includes:
  receiving, by a terminal, downlink control information, where the downlink control information carries bandwidth resource indication information;
  determining, by the terminal, an indicated bandwidth resource based on the bandwidth resource indication information; and when the indicated bandwidth resource is different from a current active bandwidth resource, determining a currently active bandwidth resource based on an uplink transmission mode configuration status or a sounding reference signal configuration status on the indicated bandwidth resource.

According to a third aspect of the embodiments of the present invention, a network device is provided. The network device includes:

a processing unit, configured to configure bandwidth resource configuration information for a terminal, where the bandwidth resource configuration information carries an initial bandwidth resource or a first active bandwidth resource; and a sending unit, configured to send the bandwidth resource configuration information to the terminal, where the sending unit is further configured to send downlink control information to the terminal, where the downlink control information carries bandwidth resource indication information, and the bandwidth resource indication information is used to indicate an identifier of a bandwidth resource, to indicate the terminal to perform a bandwidth resource switching operation.

According to a fourth aspect of the embodiments of the present invention, a terminal is provided. The terminal includes:

a receiving unit, configured to receive downlink control information, where the downlink control information carries bandwidth resource indication information; and a processing unit, configured to: determine an indicated bandwidth resource based on the bandwidth resource indication information; and when the indicated bandwidth resource is different from a current active bandwidth resource, determine a currently active bandwidth resource based on an uplink transmission mode configuration status or a sounding reference signal configuration status on the indicated bandwidth resource.

According to a fifth aspect of the embodiments of the present invention, a network device is provided. The network device includes:

a processor, configured to configure bandwidth resource configuration information for a terminal, where the bandwidth resource configuration information carries an initial bandwidth resource or a first active bandwidth resource; and a transceiver, configured to send the bandwidth resource configuration information to the terminal, where the transceiver is further configured to send downlink control information to the terminal, where the downlink control information carries bandwidth resource indication information, and the bandwidth resource indication information is used to indicate an identifier of a bandwidth resource, to indicate the terminal to perform a bandwidth resource switching operation.

According to a sixth aspect of the embodiments of the present invention, a terminal is provided. The terminal includes:

a transceiver, configured to receive downlink control information, where the downlink control information carries bandwidth resource indication information; and a processor, configured to: determine an indicated bandwidth resource based on the bandwidth resource indication information; and when the indicated bandwidth resource is different from a current active bandwidth resource, determine a currently active bandwidth resource based on an uplink transmission mode configuration status or a sounding reference signal configuration status on the indicated bandwidth resource.

According to a seventh aspect of the embodiments of the present invention, a processor is provided. The processor includes at least one circuit, and the at least one circuit is configured to perform the bandwidth resource switching method or is configured to perform the method for indicating bandwidth resource switching.

According to an eighth aspect of the embodiments of the present invention, a processing apparatus is provided. The processing apparatus includes:

a memory, configured to store an instruction; and a processor, configured to read the instruction stored in the memory, to perform any one of the foregoing methods.

The memory may be a non-transitory memory such as a read-only memory (ROM). The memory and the processor may be integrated on a same chip, or may be separately disposed on different chips. A type of the memory and a manner of disposing the memory and the processor are not limited in the embodiments of the present invention.

According to a ninth aspect of the embodiments of the present invention, a computer-readable storage medium is provided. The computer-readable storage medium includes an instruction, and when the instruction is run on a computer, the computer is enabled to perform any one of the foregoing methods.

The computer-readable storage medium is non-transitory.

According to a tenth aspect of the embodiments of the present invention, a computer program product including an instruction is provided, and when the computer program product is run on a computer, the computer is enabled to perform any one of the foregoing methods.

According to the technical solutions provided in the embodiments of the present invention, when the BWP indicated by the bandwidth resource indication information of the network device is different from the current active BWP, the terminal correctly interprets the indicated BWP based on the uplink transmission mode configuration status or the sounding reference signal configuration status in the indicated BWP, to determine whether to set the indicated BWP as the currently active bandwidth resource, so as to correctly perform uplink transmission. Implementation of the embodiments of the present invention can improve robustness and uplink transmission quality of a system.

DESCRIPTION OF EMBODIMENTS

Figure 1:
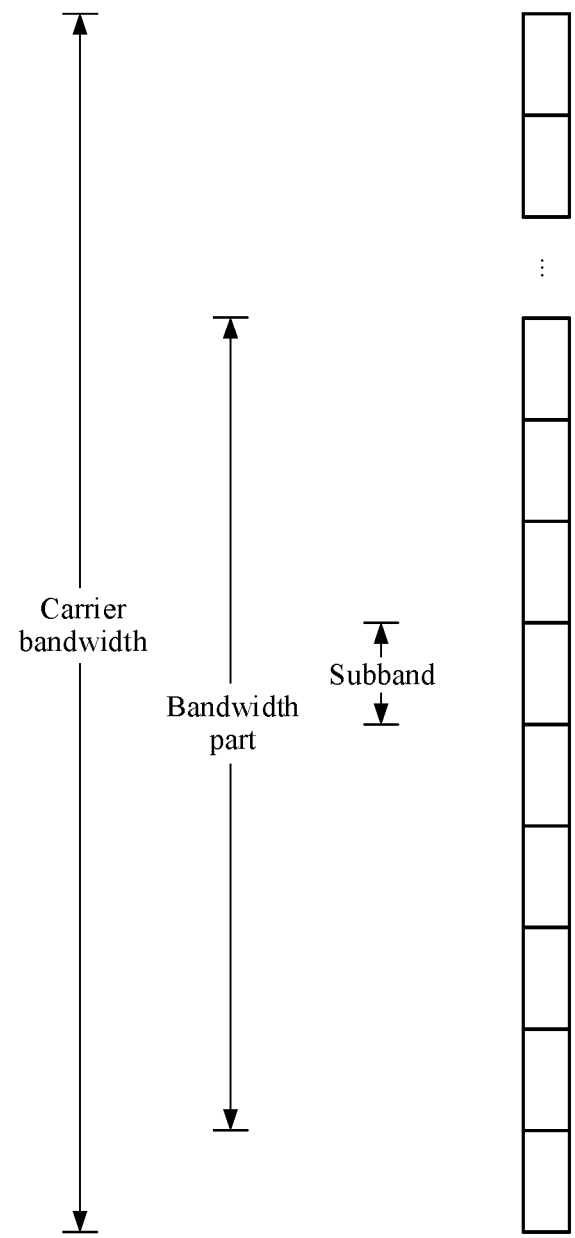
FIG. 1 is a schematic composition diagram of a carrier bandwidth according to an embodiment of the present invention.

As described in the background, in an NR technology, a system frequency resource is divided into at least one bandwidth resource, namely, a BWP. A network device may select a BWP having a relatively good channel condition for scheduling to a terminal, to communicate with the terminal. If there is a BWP having a better channel condition, the network device expects to switch the BWP for the terminal more flexibly.

The network device configures a BWP for the terminal by using radio resource control (RRC) signaling. Specifically, the network device may configure an initial BWP or a first active BWP for the terminal by using RRC signaling. Further, when the network device expects to switch the BWP for the terminal, there are the following two manners:

In one manner, the network device configures a new BWP for the terminal by using system signaling, for example, RRC signaling, and the terminal uses the new BWP as a currently active BWP, to switch the BWP. The network device may configure the BWP by using the RRC signaling in an RRC signaling reconfiguration process.

In the other manner, the network device dynamically notifies, by using downlink control signaling, for example, downlink control information (DCI) carried on a physical downlink control channel (PDCCH), the terminal to switch the BWP.

However, information, such as an uplink transmission mode and an SRS, is independently configured in each BWP. Therefore, configuration information of an uplink transmission mode or an SRS in a current active BWP may be inconsistent with configuration information of an uplink transmission mode or an SRS in a BWP to which the terminal is to switch and that is indicated in the DCI. Therefore, the terminal cannot determine how to parse the configuration information of the corresponding uplink transmission mode or SRS in the current DCI, and consequently cannot smoothly switch the BWP, and cannot perform uplink transmission.

Embodiments of the present invention provide a technical solution, so that when a bandwidth resource indicated by bandwidth resource indication information sent by a network device to a terminal is different from a current active bandwidth resource, the terminal can correctly parse downlink control information, to smoothly switch a BWP to perform uplink transmission.

In brief, in the embodiments of the present invention, when the bandwidth resource indication information is sent to the terminal by using the downlink control information to indicate the terminal to switch the BWP, the network device may impose some constraints on uplink transmission mode-related configuration information or SRS-related configuration information on the indicated bandwidth resource, and other indication information carried in the downlink control information, to avoid contradiction or ambiguity, so that the terminal can correctly parse the bandwidth resource indication information. Alternatively, when a side of a terminal receives bandwidth resource indication information sent by a network device by using downlink control information, the terminal parses the downlink control information in an unambiguous parsing manner. In this way, the BWP is smoothly switched, and uplink transmission is performed.

The technical solutions provided in the present invention are described in detail with reference to accompanying drawings and specific embodiments. Before formal descriptions are started, some technical features that may be related to the embodiments of the present invention are briefly described.

Bandwidth Resource

Generally, for a definition of the bandwidth resource, refer to a definition of a bandwidth part in an NR technical standard that is currently in a discussion phase. The bandwidth part may include a group of consecutive physical resource blocks (PRB) in frequency domain, and a bandwidth of the bandwidth part is less than or equal to a maximum bandwidth supported by user equipment (UE). The bandwidth part may include the following attributes, for example, a system configuration parameter, a user equipment-related configuration parameter, a frequency position, and a bandwidth.

The bandwidth resource may also be referred to as a frequency resource part, a partial frequency resource, a carrier bandwidth part, or another name. This is not limited in this application. When the bandwidth resource is a segment of consecutive resources in a system frequency resource, the bandwidth resource may also be referred to as a subband, a narrowband, or another name. A specific form of the bandwidth resource is not limited in the embodiments of the present invention.

For different bandwidth resources, using a bandwidth resource A and a bandwidth resource B as an example, that the bandwidth resource A and the bandwidth resource B are different includes:

a part of or all of frequency resources included in the bandwidth resource A are not included in the bandwidth resource B, or a part of or all of frequency resources included in the bandwidth resource B are not included in the bandwidth resource A.

For example, in an orthogonal frequency division multiple access (OFDMA)-based communications system, that the bandwidth resource A and the bandwidth resource B are different may be:

at least one subcarrier included in the bandwidth resource A is not included in the bandwidth resource B, or at least one subcarrier included in the bandwidth resource B is not included in the bandwidth resource A; or frequency domain resources of the bandwidth resource A and the bandwidth resource B completely overlap, but frame structures (for example, subcarrier spacings or CP lengths) are different, and so on.

The frequency domain resources of the bandwidth resource A and the bandwidth resource B may completely overlap, partially overlap, or not overlap.

Bandwidth resources may further be classified into an uplink BWP and a downlink BWP. The downlink BWP is used for downlink communication transmission, and is used to transmit a downlink channel, a downlink signal, and the like. The uplink BWP is used for uplink communication transmission, and is used to transmit an uplink channel, an uplink signal, and the like. One or more BWPs may be configured for a terminal in one serving cell or carrier. For example, one terminal in one serving cell or carrier supports a maximum of four BWPs. Specifically, one terminal in one serving cell or carrier may support a maximum of four uplink BWPs and/or four downlink BWPs.

Active Bandwidth Resource

In this specification, an active bandwidth resource (active BWP) is a BWP in an active state. Usually, the active state is relative to a time unit. In this specification, active BWPs may be classified into three types:

Initial active BWP: The initial active BWP is usually a BWP that is in an active state and that is used for transmission in an initial access phase. The initial active BWP may be obtained by using a system message or a broadcast message, and a configuration of the initial active BWP is obtained by using higher layer signaling.

First active BWP: A corresponding first uplink active BWP and a corresponding first downlink active BWP may be obtained by configuring a BWP in an RRC message. When configuring a BWP, a network device may specify one BWP or some BWPs as a first active BWP or first active BWPs. In this case, when receiving an indication message, a terminal sets the BWP or the BWPs as the active BWP or the active BWPs, until the terminal receives bandwidth resource indication information, indicating the terminal to switch the current BWP.

Current active bandwidth resource (active BWP): The current active bandwidth resource is a BWP in an active state in a current time unit, and is also a BWP that is currently active before a next effective BWP.

Effective Bandwidth Resource

An effective BWP can be used for uplink and downlink transmission. A currently active BWP, namely, a BWP that is effective in a current time unit, may be a BWP that replaces an effective BWP in a previous time unit, or may be a BWP that has taken effect in a previous time unit and continues to take effect in the current time unit. Certainly, the effective BWP is in an active state.

DCI Format

DCI formats mentioned in this specification are classified into the following types:

(1) Uplink grant DCI: The uplink grant DCI includes DCI in a fallback mode and DCI in a normal mode, which are usually referred to as a DCI format 0_0 and a DCI format 0_1.

The DCI format 0_0 indicates information about a single-antenna transmission-based PUSCH. The DCI format 0_1 indicates information about a physical uplink shared channel (PUSCH) that allows uplink multiple-input multiple-output (MIMO).

(2) Downlink grant DCI: The downlink grant DCI includes DCI in a fallback mode and DCI in a normal mode, which are usually referred to as a DCI format 1_0 and a DCI format 1_1.

The DCI format 1_0 indicates information about a single-antenna transmission-based physical downlink shared channel (PDSCH). The DCI format 1_1 indicates information about a PDSCH that allows downlink MIMO.

(3) DCI 2_x: The DCI 2_x is usually used for group scheduling, and may be used to indicate information about a plurality of terminals, for example, indicate a PUSCH, a physical uplink control channel (PUCCH), a sounding reference signal (SRS), or power control information of one or more terminals. A value of x may be 0, 1, 2, 3, or the like. The values respectively represent different functions.

Uplink transmission may be indicated by using the uplink grant DCI. There are two uplink transmission modes (which are mainly uplink MIMO modes) in a 5G system:

One is codebook based (CB) transmission.

The other is non-codebook based (NCB) transmission.

Because the DCI format 0_0 indicates a PUSCH transmitted through a single antenna, whether the PUSCH transmission indicated by the DCI format 0_0 is codebook based PUSCH transmission or non-codebook based PUSCH transmission may not be distinguished. The DCI format 0_1 may be used to indicate information related to a PUSCH transmitted based on a codebook or transmitted based on a non-codebook.

Whether the PUSCH is transmitted based on a codebook or transmitted based on a non-codebook may be configured by using an RRC message. The RRC message may be configured for each BWP. That is, uplink transmission modes in different BWPs may be different, or there may be a case in which no uplink transmission mode is configured in one or more BWPs. In this way, in a BWP in which no uplink transmission mode is configured, uplink data can be scheduled only by using the DCI format 0_0 based on the foregoing descriptions.

SRI Field and SRS Request Field of DCI

The DCI includes a plurality of pieces of indication information, for example, sounding reference signal indication information, or sounding reference signal request information. The sounding reference signal indication information is used to indicate an SRS indicator (SRI), and is represented as an SRI field. The sounding reference signal request information is used to indicate an SRS request, and is represented as an SRS request field.

It should be noted that, regardless of codebook (CB) based transmission or non-codebook (NCB) based transmission, and a quantity of configured SRSs, a quantity of bits of the SRI field in the DCI may be affected.

During CB based transmission, the SRI field in the DCI is $\lceil \log_2(N_{SRS}) \rceil$ bits, where $N_{SRS}$ is a quantity of SRS resources in a configured SRS resource set used for the CB based transmission; or during NCB based transmission, the SRI field in the DCI is $$\left\lceil \log_2\left( \sum_{k=1}^{min\{L_{max}^{PUSCH}, N_{SRS}\}} \binom{N_{SRS}}{k} \right) \right\rceil$$

bits, where $N_{SRS}$ is a quantity of SRS resources in a configured SRS resource set used for the NCB based transmission, and $L_{max}^{PUSCH}$ is a maximum quantity of layers supported for PUSCH transmission.

A state corresponding to a value of the SRS request field may indicate a terminal not to send an SRS or to send an SRS, and the SRS is a preconfigured SRS that has a correspondence with the SRS request field in the DCI.

Uplink transmission mode configuration information and SRS configuration information in each BWP are independently configured. Therefore, when configuration information in a current BWP is inconsistent with configuration information in a BWP to which a terminal is to switch and that is indicated in DCI, the terminal cannot determine how to interpret an SRI field or an SRS request field corresponding to the current DCI, and cannot determine a beam based on which a transmit beam for a PUSCH needs to be determined. The technical solutions of the embodiments of the present invention are intended to resolve the technical problem.

The following describes in detail the technical solution provided in the embodiments of the present invention.

Figure 2:
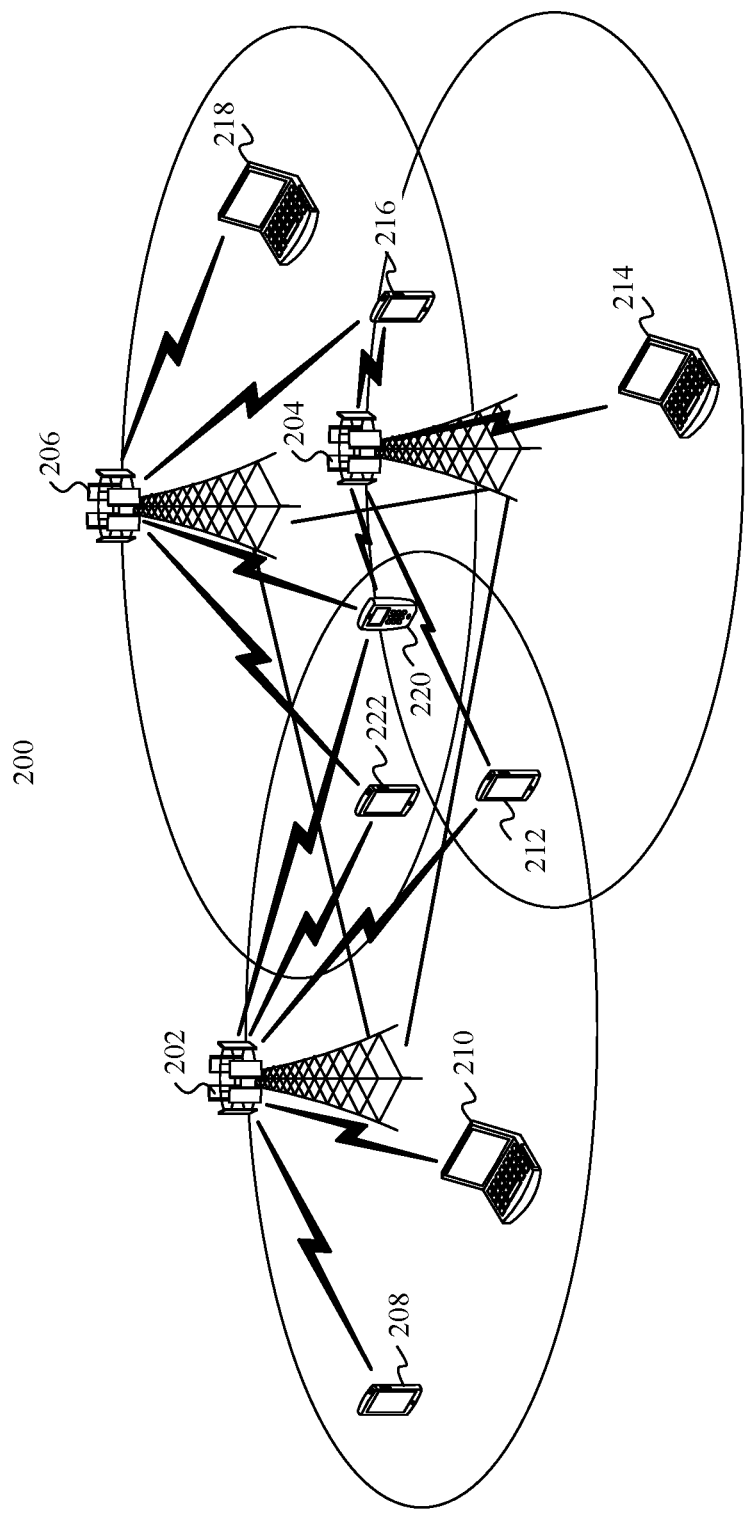
FIG. 2 is an example of a schematic diagram of a wireless communications network according to an embodiment of the present invention.

FIG. 2 is an example of a schematic diagram of a wireless communications network 200 according to an embodiment of the present invention. As shown in FIG. 2, the wireless communications network 200 includes base stations 202 to 206 and terminal devices 208 to 222. The base stations 202 to 206 may communicate with each other through backhaul links (as indicated by straight lines between the base stations 202 to 206). The backhaul link may be a wired backhaul link (for example, an optical fiber or a copper cable), or may be a wireless backhaul link (for example, microwave). The terminal devices 208 to 222 may communicate with the corresponding base stations 202 to 206 through radio links (as indicated by broken lines between the base stations 202 to 206 and the terminal devices 208 to 222).

The base stations 202 to 206 are configured to provide wireless access services for the terminal devices 208 to 222. Specifically, each base station corresponds to a service coverage area (which may also be referred to as a cell, and is indicated by each oval area in FIG. 2). A terminal device entering the area may communicate with the base station by using a wireless signal, to receive the wireless access service provided by the base station. The service coverage areas of the base stations may overlap. A terminal device in an overlapping area may receive wireless signals from a plurality of base stations. Therefore, the base stations may coordinate with each other, to serve the terminal device. For example, the plurality of base stations may serve the terminal device in the overlapping area by using a coordinated multipoint (CoMP) technology. For example, as shown in FIG. 2, there is an overlapping area between service coverage areas of the base station 202 and the base station 204, and the terminal device 222 is in the overlapping area. Therefore, the terminal device 222 may receive wireless signals from the base station 202 and the base station 204, and the base station 202 and the base station 204 may coordinate with each other, to serve the terminal device 222. For another example, as shown in FIG. 2, there is a common overlapping area among service coverage areas of the base station 202, the base station 204, and the base station 206, and the terminal device 220 is in the overlapping area. Therefore, the terminal device 220 may receive wireless signals from the base stations 202, 204, and 206, and the base stations 202, 204, and 206 may coordinate with each other, to serve the terminal device 220.

Depending on a wireless communications technology in use, the base station may also be referred to as a NodeB, an evolved NodeB (eNodeB), an access point (AP), or the like. In addition, based on sizes of the service coverage areas provided by the base stations, the base stations may further be classified into a macro base station for providing a macro cell, a micro base station for providing a micro cell, a femto base station for providing a femto cell, and the like. With continuous evolution of the wireless communications technology, another name may also be used for a future base station.

The terminal devices 208 to 222 may be various wireless communications devices having a wireless communication function, but are not limited to, for example, a mobile cellular phone, a cordless phone, a personal digital assistant (PDA), a smartphone, a notebook computer, a tablet computer, a wireless data card, a wireless modem, or a wearable device such as a smartwatch. As an internet of things (IoT) technology emerges, a growing quantity of devices that previously do not have a communication function, including but not limited to, for example, a household appliance, a transportation vehicle, a tool device, a service device, and a service facility, start to obtain the wireless communication function by being configured with a wireless communications unit. In this way, these devices can access a wireless communications network and accept remote control. This type of device has the wireless communication function because of being configured with the wireless communications unit. Therefore, this type of device is also a type of wireless communications device. In addition, the terminal devices 208 to 222 may also be referred to as mobile stations, mobile devices, mobile terminals, wireless terminals, handheld devices, clients, or the like.

A plurality of antennas may be configured for each of the base stations 202 to 206 and the terminal devices 208 to 222, to support a MIMO (multiple-input multiple-output) technology. Further, the base stations 202 to 206 and the terminal devices 208 to 222 may not only support a single-user MIMO (SU-MIMO) technology, but also support a multi-user MIMO (MU-MIMO) technology. The MU-MIMO may be implemented based on a space division multiple access (SDMA) technology. Because the plurality of antennas are configured, the base stations 202 to 206 and the terminal devices 208 to 222 may further flexibly support a single-input single-output (SISO) technology, a single-input multiple-output (SIMO) technology, and a multiple-input single-output (MISO) technology, to implement various types of diversity technologies (including but not limited to, for example, a transmit diversity technology and a receive diversity technology) and multiplexing technologies. The diversity technology may include but is not limited to, for example, the transmit diversity (TD) technology and the receive diversity (RD) technology, and the multiplexing technology may be a spatial multiplexing technology. In addition, the foregoing various types of technologies may further include a plurality of implementation solutions. For example, the transmit diversity technology may include but is not limited to, for example, diversity manners such as a space time transmit diversity (STTD), a space-frequency transmit diversity (SFTD), a time switched transmit diversity (TSTD), a frequency switched transmit diversity (FSTD), an orthogonal transmit diversity (OTD), and a cyclic delay diversity (CDD), and diversity manners obtained after deriving, evolving, and combining the foregoing various types of diversity manners. For example, currently, transmit diversity manners such as space-time block coding (STBC), space frequency block coding (SFBC), and the CDD are used in an LTE standard. The transmit diversity is described above in general by using examples. A person skilled in the art should understand that the transmit diversity is further implemented in a plurality of other manners in addition to those in the foregoing examples. Therefore, the foregoing descriptions should not be understood as limitations on the technical solutions of the present invention, and the technical solutions of the present invention should be understood as applicable to various possible transmit diversity solutions.

In addition, the base stations 202 to 206 and the terminal devices 208 to 222 may communicate with each other by using various wireless communications technologies, including but not limited to, for example, a time division multiple access (TDMA) technology, a frequency division multiple access (FDMA) technology, a code division multiple access (CDMA) technology, a time division-synchronous code division multiple access (TD-SCDMA) technology, an orthogonal frequency division multiple access (OFDMA) technology, a single carrier frequency division multiple access (SC-FDMA) technology, a space division multiple access (SDMA) technology, and evolved and derived technologies of these technologies. As radio access technologies (RAT), the foregoing wireless communications technologies are adopted in various wireless communication standards, so that various wireless communications systems (or networks) that are well known today are constructed. These wireless communications systems include, but are not limited to, a communications system in global system for mobile communications (GSM), CDMA 2000, wideband CDMA (WCDMA), Wi-Fi defined in 802.22 series standards, worldwide interoperability for microwave access (WiMAX), long term evolution (LTE), and LTE-Advanced (LTE-A), and evolved systems of these wireless communications systems. Unless otherwise specified, the technical solutions provided in the embodiments of the present invention may be used in the foregoing various wireless communications technologies and wireless communications systems. In addition, the terms "system" and "network" may be interchanged.

It should be noted that the wireless communications network 200 shown in FIG. 2 is merely used as an example, and is not intended to limit the technical solutions of the present invention. A person skilled in the art should understand that in a specific implementation process, the wireless communications network 200 may further include another device, and a quantity of base stations and a quantity of terminal devices may further be configured based on a specific requirement.

Figure 3:
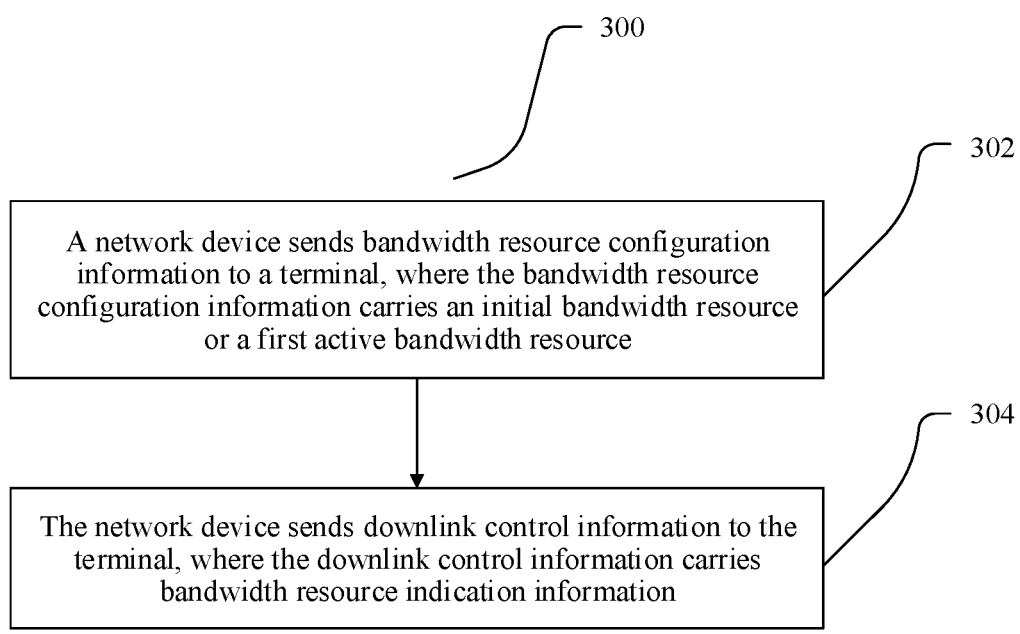
FIG. 3 is a schematic flowchart of a method for indicating bandwidth resource switching according to an embodiment of the present invention.

FIG. 3 is an example of a flowchart of a method 300 for indicating bandwidth resource switching according to an embodiment of the present invention. In a specific implementation process, the method 300 may be performed by a network device, and the network device may be but is not limited to, for example, the base stations 202 to 206 shown in FIG. 2.

Step 302: The network device sends bandwidth resource configuration information to a terminal, where the bandwidth resource configuration information carries an initial bandwidth resource or a first active bandwidth resource. A meaning of the initial bandwidth resource or the first active bandwidth resource has been described in detail above, and details are not described herein again.

Specifically, the bandwidth resource configuration information is sent to the terminal by using higher layer configuration signaling such as RRC signaling. The RRC signaling may carry indication information of the initial BWP or the first active BWP, to configure an available BWP for the terminal. For example, the network device may configure a maximum of 4N uplink (UL) BWPs and/or 4N downlink (DL) BWPs for the terminal by using the RRC signaling, where N is a non-zero positive integer. For example, a value of N may be 1, 2, 3, or 4.

The RRC signaling is layer 3 signaling, and the layer 3 signaling is usually some control messages. A sending periodicity or a control periodicity of the L3 signaling is usually relatively long, and the L3 signaling is applicable to sending of some information that does not change frequently. For example, in some existing communication standards, the L3 signaling is usually used to carry some configuration information. The bandwidth resource configuration information may alternatively be sent by using layer 3 signaling other than the RRC signaling.

Step 304: The network device sends downlink control information to the terminal, where the downlink control information carries bandwidth resource indication information, and the bandwidth resource indication information is used to indicate an identifier of a bandwidth resource (Bandwidth part indicator), to indicate the terminal to perform a bandwidth resource switching operation.

Optionally, before the network device sends downlink control signaling to the terminal, the network device obtains bandwidth resource indication information carried in downlink control signaling sent by another network device to the terminal; or after the network device sends downlink control signaling to the terminal, the network device notifies another network device of bandwidth resource indication information carried in the downlink control signaling sent by the network device to the terminal. In such a negotiation process, a bandwidth resource indicated by the bandwidth resource indication information sent by the network device is the same as a bandwidth resource indicated by the bandwidth resource indication information carried in the downlink control signaling sent by the another network device to the terminal. Certainly, the network device may alternatively send the downlink control signaling without negotiating with the another network device. If the terminal device complies with the indication of the bandwidth resource indication information carried in the downlink control signaling sent by the network device, the terminal device switches, based on the identifier of the bandwidth resource, the bandwidth resource to the bandwidth resource indicated by the network device, feeds back an acknowledgement to the network device, and feeds back a negative acknowledgement to the another network device; or the terminal feeds back, to the another network device, the identifier of the bandwidth resource to which the terminal needs to switch, is to switch, or has switched. If the terminal device does not comply with the indication of the bandwidth resource indication information carried in the downlink control signaling sent by the network device, the network device may receive a negative acknowledgement fed back by the terminal, or further receive an identifier of a bandwidth resource that is fed back by the terminal and to which the terminal needs to switch, is to switch, or has switched. The network device may alternatively receive, from the another network device, an identifier of a bandwidth resource to which the terminal needs to switch, is to switch, or has switched.

The downlink control signaling in this specification may be downlink control information.

Specifically, if there is a bandwidth resource having a better channel condition in a system bandwidth, and the network device expects the terminal to switch to the bandwidth resource having the better channel condition to communicate with the terminal, the network device may dynamically notify, by using the downlink control information, the terminal to switch the BWP.

It should be noted that an uplink transmission mode and an SRS need to be configured in a current active BWP. Otherwise, based on the foregoing descriptions, the network device cannot indicate, by using DCI format 0_1, the terminal to switch the BWP.

When the network device sends the bandwidth resource indication information to the terminal by using the downlink control information, an uplink transmission mode and an SRS need to be configured in the BWP indicated by the bandwidth resource indication information. Otherwise, the network device can schedule the terminal only by using DCI format 0_0, and if the network device indicates the terminal to switch the BWP in this case, after the terminal switches the BWP, the network device cannot schedule the terminal again by using the downlink control information. Consequently, system performance flexibility is affected.

If no uplink transmission mode or SRS is configured on the bandwidth resource indicated by the bandwidth resource indication information, the network device further needs to include transmission indication information in the downlink control information, to indicate single-antenna transmission.

In this case, the network device can schedule the terminal only by using DCI format 0_0.

Herein, the transmission indication information is antenna port indication information, and the antenna port indication information indicates one antenna port; or the transmission indication information is precoding indication information, the precoding indication information includes a transmission rank indication or a precoding matrix, and a value of a rank of the transmission rank indication is 1, or the precoding matrix is a 1×1 dimensional matrix, and content of the matrix is [1].

In the foregoing described manner, the transmission indication information of the network device is set, so that the terminal performs transmission on a single antenna port. In another possible implementation, if no uplink transmission mode or sounding reference signal is configured on the bandwidth resource indicated by the bandwidth resource indication information, regardless of how the terminal sends an uplink shared channel, the network device receives the uplink shared channel on a single antenna port.

For another example, if no sounding reference signal is configured on the bandwidth resource indicated by the bandwidth resource indication information, the DCI further carries SRI request information, and the SRI request information indicates the terminal not to send a sounding resource, because in this case, the terminal has no SRS resource configuration in the indicated BWP.

Specifically, SRS request information is specifically represented as an SRS request field, a state corresponding to a value of the SRS request field may indicate the terminal not to send an SRS or to send an SRS, and the SRS is a preconfigured SRS that has a correspondence with the SRS request field in the DCI. When there is no resource configuration in the indicated BWP, the value of the SRS request field can only correspond to a state in which no SRS is to be sent. The SRS request field may be X bits, and one value of the field is a state. For example, a first state indicates the terminal not to send an SRS, a second state indicates the terminal to send a first SRS, a third state indicates the terminal to send a second SRS, and a fourth state indicates the terminal to send a third SRS. In this case, the value should correspond to the first state.

For example, the SRS request field is two bits, 00 indicates that no SRS is to be sent, 01 indicates that the first SRS is to be sent, 10 indicates that the second SRS is to be sent, and 11 indicates that the third SRS is to be sent. In this case, if the terminal needs to be indicated not to send the sounding resource, the value of the SRS request field should be 00. Certainly, this is merely an example herein, and bit information indicating the terminal not to send the sounding resource may alternatively be in another form.

If the uplink transmission mode and the SRS are configured on the bandwidth resource indicated by the bandwidth resource indication information, the network device may schedule the terminal by using DCI format 0_1.

In this embodiment of the present invention, when the bandwidth resource indication information is sent to the terminal by using the downlink control information, the network device may impose some constraints on uplink transmission mode-related configuration information and SRS-related configuration information on the indicated bandwidth resource, and other indication information carried in the downlink control information. In this way, no ambiguity occurs when the terminal parses the downlink control information, so that the terminal determines whether to switch the BWP, to correctly perform uplink transmission.

The foregoing provides operation descriptions when the network device indicates, by using the downlink control information, the terminal to switch the BWP. The following describes how the terminal parses, when receiving, from the network device, the downlink control information and the bandwidth resource indication information carried in the downlink control information, the downlink control information and the bandwidth resource indication information carried in the downlink control information, and how to switch the BWP.

Figure 4:
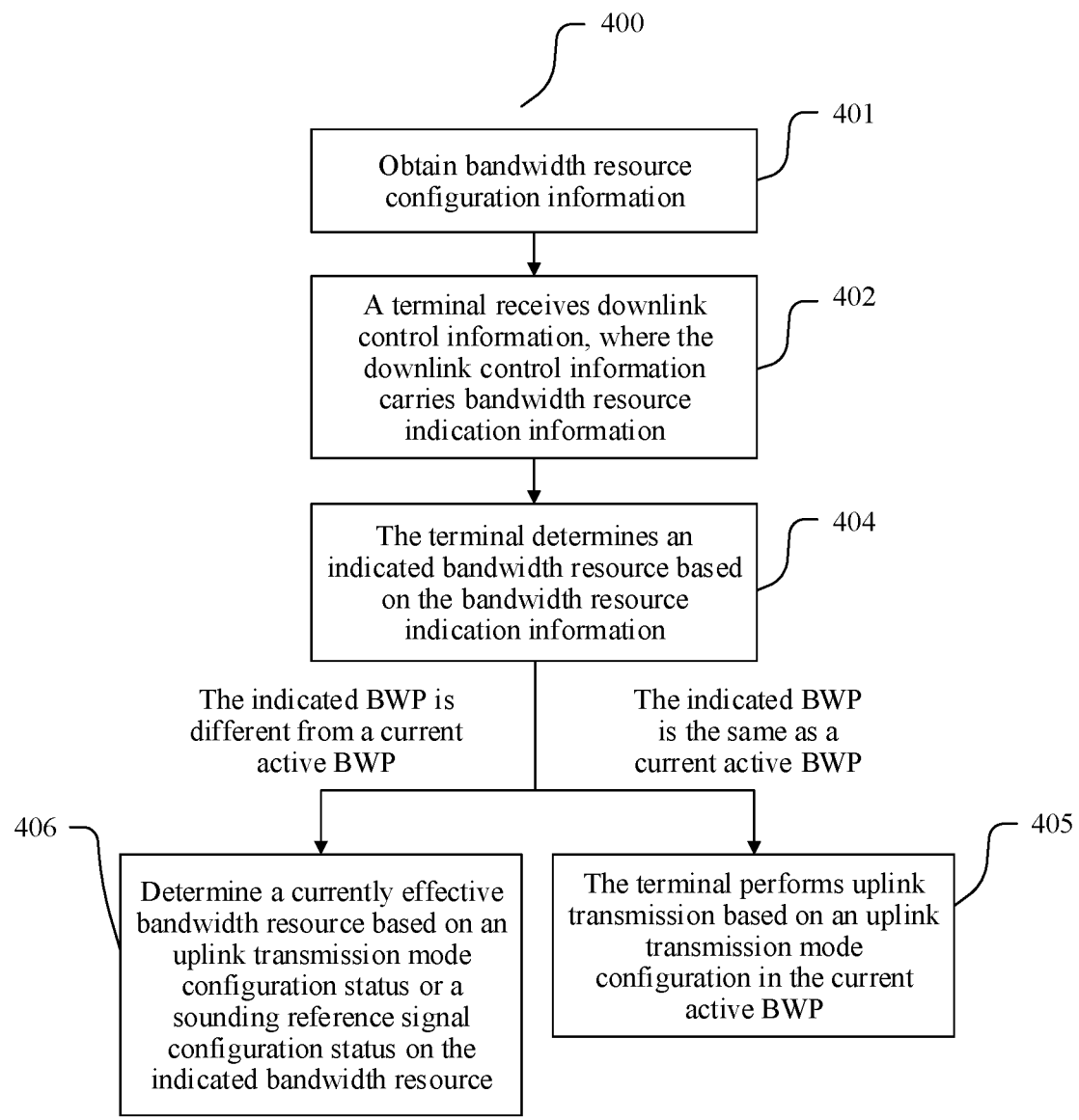
FIG. 4 is a schematic flowchart of a bandwidth resource switching method according to an embodiment of the present invention.

FIG. 4 is an example of a flowchart of a bandwidth resource switching method 400 according to an embodiment of the present invention. In a specific implementation process, the method 400 may be performed by a receive end device, and the receive end device may be but is not limited to, for example, the terminal devices 208 to 222 shown in FIG. 2.

Step 402: A terminal receives downlink control information, where the downlink control information carries bandwidth resource indication information.

Optionally, before step 402, the terminal has obtained bandwidth resource configuration information by performing a series of operations such as uplink synchronization and downlink synchronization in step 401. For example, a network device sends the bandwidth resource configuration information to the terminal device by using a system message or a broadcast message, and the terminal device selects a corresponding BWP as a currently active BWP based on an initial BWP or a first active BWP configured in the bandwidth resource configuration information, and performs uplink transmission in the BWP. An uplink synchronization process and a downlink synchronization process are well known to a person skilled in the art, and details are not described herein again.

When configuring a BWP, the network device may specify one BWP or some BWPs as a first active BWP or first active BWPs. In this case, when receiving an indication message, the terminal sets the BWP or the BWPs as an active BWP or active BWPs, and the active BWP is a currently active BWP until the terminal receives the bandwidth resource indication information indicating the terminal to switch the current BWP.

It should be noted that the current active BWP is a BWP that takes effect in a current time unit. In the active BWP, the terminal may send and receive a signal. On a resource other than the active BWP, generally, the terminal does not send or receive a signal. In a special case, the terminal may be allowed to perform radio resource management measurement outside a resource range of the current active BWP.

Switching of an active BWP in a time unit may be notified by using DCI in a communication process.

Herein, a granularity of one time unit may be referred to as a unit of time. The unit of time is used to represent a time unit in time domain, and may be, for example, one or more of a sampling point, a symbol, a mini slot, a slot, a subframe, or a radio frame. Information about the unit of time may include a type, a length, a structure, or the like of the unit of time. Optionally, the unit of time may be understood as a time domain unit for resource scheduling.

Further, the terminal device may receive more than one piece of downlink control signaling in the current time unit, and the downlink control signaling may be used for an uplink grant or a downlink grant. If the terminal receives a plurality of pieces of uplink bandwidth resource indication information in the current time unit; or the terminal receives a plurality of pieces of downlink bandwidth resource indication information in the current time unit; or the terminal receives a plurality of pieces of uplink bandwidth resource indication information and time units indicated by uplink control signaling in which the uplink bandwidth resource indication information of the terminal is located are consistent; or the terminal receives a plurality of pieces of downlink bandwidth resource indication information and time units indicated by downlink control signaling in which the downlink bandwidth resource indication information of the terminal is located are consistent, the terminal device does not expect that bandwidth resources indicated by the plurality of pieces of bandwidth resource indication information received are different, or if the plurality of pieces of bandwidth resource indication information are different, the terminal device uses one of the plurality of pieces of bandwidth resource indication information.

Step 404: The terminal determines an indicated bandwidth resource based on the bandwidth resource indication information.

In a same time unit, the terminal device may receive more than one piece of downlink control signaling, and the terminal device does not expect that bandwidth resources indicated by a plurality of pieces of bandwidth resource indication information received by the terminal device are different. In other words, the bandwidth resources indicated by the plurality of pieces of bandwidth resource indication information received by the terminal device should be the same, that is, the bandwidth resources indicated by the plurality of pieces of bandwidth resource indication information sent by a plurality of network devices to the terminal device are the same. That the bandwidth resources indicated by the plurality of pieces of bandwidth resource indication information sent by the plurality of network devices are the same may mean that the network devices in a plurality of intra-frequency cells or the network devices in a same cell send the plurality of pieces of bandwidth resource indication information, and the bandwidth resources indicated by the plurality of pieces of bandwidth resource indication information are the same; or the plurality of pieces of bandwidth resource indication information sent by the plurality of network devices in different cells or in inter-frequency cells after negotiation indicate frequency domain resources at a same bandwidth position.

A process in which the plurality of network devices send, to the terminal through negotiation, the bandwidth resource indication information indicating the frequency domain resources at the same bandwidth position is specifically:

The network devices exchange information, where the exchanged information includes the bandwidth resource indication information (for example, BWP indication information), and the network device further sends, to another network device, a time at which the bandwidth resource indication information is to be sent to the terminal. For example, the network devices negotiate with each other to send DCI in a time unit, for example, a slot n, to indicate a same bandwidth resource, for example, a BWP (y). Then, the network device sends the DCI based on the exchanged information, where the DCI carries the bandwidth resource indication information or further includes the time at which the bandwidth resource indication information is to be sent.

It should be noted that the frequency domain resource herein is a resource block (RB), a resource block group (RBG), a predefined subband (subband), a band, a bandwidth part (BWP), a component carrier (CC), or a cell. The cell herein may be a serving cell.

As described above, the downlink control signaling may be DCI carried on a PDCCH. A plurality of pieces of downlink control signaling may be sent by using a same frequency domain resource or different frequency domain resources.

An example in which the frequency domain resource is a cell is used. Whether a plurality of pieces of downlink control signaling are sent by using a same frequency domain resource may be determined by determining whether the plurality of pieces of downlink control signaling are from a same cell, that is, determining whether PDCCH configurations corresponding to the plurality of pieces of downlink control signaling are configured in a same cell configuration; or whether PDSCH configurations respectively scheduled by using the plurality of pieces of downlink control signaling are configured in a same cell configuration.

If the plurality of pieces of downlink control signaling are sent by using the same frequency domain resource, that is, the plurality of pieces of downlink control signaling are from the same cell, identifiers of bandwidth resources indicated by a plurality of pieces of bandwidth resource indication information indicated by the plurality of pieces of downlink control signaling are the same, that is, bandwidth positions corresponding to the bandwidth resources are the same.

If the plurality of pieces of downlink control signaling are sent by using different frequency domain resources, that is, the plurality of pieces of downlink control signaling are from different cells, identifiers of bandwidth resources indicated by a plurality of pieces of bandwidth resource indication information indicated by the plurality of pieces of downlink control signaling may be different, but bandwidth positions corresponding to the bandwidth resources indicated by the plurality of pieces of bandwidth resource indication information are the same. That bandwidth positions are the same includes: any two of start positions, bandwidth sizes, and end positions of the bandwidth resources indicated by the plurality of pieces of bandwidth resource indication information are the same. The bandwidth resource may be obtained by obtaining the end position based on the start position and the bandwidth size; or the bandwidth resource may be obtained based on the start position and the end position; or the bandwidth resource may be obtained by obtaining the start position based on the bandwidth size and the end position.

That start positions of the bandwidth resources are the same includes that actual start positions determined based on frequency domain reference points and offsets are the same. An example in which the bandwidth resource is a BWP is used. A start position of the BWP is relative to a frequency domain reference point (for example, a reference point A) in a serving cell, and the start position of the BWP may be notified by the network device to the terminal. That start positions of the bandwidth resources indicated by the plurality of pieces of bandwidth resource indication information are the same may mean that frequency domain reference points of the different serving cells are the same (K1=K3), and offsets of the bandwidth resources indicated by the plurality of pieces of bandwidth resource indication information relative to the frequency domain reference points are the same (offset 1=offset 2). Alternatively, that start positions are the same may mean that actual start positions of the bandwidth resources determined based on frequency domain reference points and offsets are the same. Alternatively, a sum of a difference between frequency domain reference points of the different serving cells and a difference between offsets of the bandwidth resources indicated by the plurality of pieces of bandwidth resource indication information of the different serving cells relative to the frequency domain reference points is equal to 0, to ensure that actual start positions of different bandwidth resources are the same.

A row in Table 1 represents frequency domain units in ascending order. The first row indicates that a position of a point A in a first serving cell is K1, and an actual start position of a BWP 1 is determined based on the position of the point A and an offset, that is, K2=K1+offset1. The second row indicates that a position of a point A in a second serving cell is K3, and an actual start position of a BWP 2 is determined based on the position of the point A and an offset, that is, K4=K3+offset2.

A difference between the position K1 of the reference point A of the first serving cell and the position K3 of the point A of the second serving cell is K1-K3=-2. A value of the offset 1 of the first serving cell is 5, a value of the offset 2 of the second serving cell is 3, and a difference between the offset 1 of the first serving cell and the offset 2 of the second serving cell is 5-3=2. A sum of the differences is -2+2=0, and it indicates that the actual start position (K2=K1+offset 1) of the BWP 1 in the first serving cell is equal to the actual start position (K4=K3+offset 2) of the BWP 2 in the second serving cell.

The actual start position of the BWP in the first serving cell is the same as the actual start position of the BWP in the second serving cell.

TABLE 1

| Point A (K1) of the first serving cell | Start position of the BWP 1 (K2 = K1 + offset 1) | | |
|---|---|---|---|
| | | Point A (K3) of the second serving cell | Start position of the BWP 2 (K4 = K3 + offset 2) |

In addition, the start position or the end position of the BWP described herein is a start position or an end position obtained after a numerology of the serving cell is considered. In other words, the start position or the end position of the BWP is a start position or an end position that is converted by using the numerology as a reference. The numerology may be used to determine a subcarrier spacing, a symbol length, a CP length (a cyclic prefix), and the like.

For example, if K1=K3, a numerology of the first serving cell is marked as u1, and a numerology of the second serving cell is marked as u2, offset $1*(2^{u1})$=offset $2*(2^{u2})$. For example, if u1=0 corresponds to a subcarrier spacing of 15 k KHz, and u2=1 corresponds to a subcarrier spacing of 30 k KHz, a granularity of a minimum frequency domain unit of the first serving cell is half of a granularity of a minimum frequency domain unit of the second serving cell. In this case, when reference points of the serving cells are the same, to make the actual start positions of the BWPs be the same, a value of the offset 1 of the first cell is twice a value of the offset 2, where k indicates 1000.

That bandwidth sizes are the same means that bandwidth sizes converted based on the numerology are the same. If a bandwidth of the BWP corresponding to the first serving cell is N1 RBs, a bandwidth of the BWP corresponding to the second serving cell is N2 RBs, a subcarrier spacing corresponding to the numerology u1 of the first serving cell is 15 k$2^{u1}$, and a subcarrier spacing corresponding to the numerology u2 of the second serving cell is 15 k$2^{u2}$, N1*15 k$2^{u1}$=N2*15 k$2^{u2}$.

In addition, it may further be required that numerologies corresponding to the plurality of indicated bandwidth resources are the same, that is, the numerologies corresponding to the bandwidth resources indicated by the different network devices are the same.

When the bandwidth resource indicated by the bandwidth resource indication information carried in the plurality of pieces of downlink control signaling are the same, the terminal may determine the indicated bandwidth resource based on any one or more of the plurality of pieces of bandwidth resource indication information, that is, select a bandwidth resource corresponding to one piece of bandwidth resource indication information as the indicated bandwidth resource. Then, a corresponding acknowledgement is fed back for the downlink control signaling selected by the terminal, and a negative acknowledgement is fed back for other downlink control signaling. Further, the terminal may further feed back, for the other downlink control signaling, an identifier of the bandwidth resource selected by the terminal, to notify a corresponding network device of the bandwidth resource to which the terminal is to switch.

In another case, at least two of the bandwidth resources indicated by the bandwidth resource indication information carried in the plurality of pieces of downlink control signaling are different.

Specifically, the network devices exchange bandwidth resource configuration information configured by the network devices for the terminal, for example, BWP configuration information, which is specifically information such as a start position, an end position, and a size of a BWP. In this way, the network devices may determine actual available bandwidth resources based on bandwidth resource information that is to be indicated by the network devices, and then the network devices respectively indicate the actual available bandwidth resources to the terminal.

For this case, one implementation is determining, by the terminal, an intersection set of the bandwidth resources indicated by the plurality of pieces of bandwidth resource indication information as the indicated bandwidth resource.

That is, the terminal uses, as a start position of the indicated bandwidth resource, a start position having a largest identifier value in the start positions corresponding to the bandwidth resources indicated by the plurality of pieces of bandwidth resource indication information; and/or the terminal uses, as an end position of the indicated bandwidth resource, an end position having a smallest identifier value in the end positions corresponding to the bandwidth resources indicated by the plurality of pieces of bandwidth resource indication information.

For example, the determined indicated bandwidth resource is a BWP. The terminal uses, as a start position of the BWP, a start position having a second largest or largest value of an identifier or an index in actual start positions corresponding to the bandwidth resources indicated by the plurality of pieces of bandwidth resource indication information; and uses, as an end position of the BWP, an end position having a second smallest or smallest value of an identifier or an index in actual end positions corresponding to the bandwidth resources indicated by the plurality of pieces of bandwidth resource indication information.

As shown in Table 2, in this case, the actual start position of the BWP is max(K2, K4)=K4, and the actual end position is min(K5, K6)=K5. Therefore, the indicated bandwidth resource determined by the terminal is a BWP including frequency domain units starting from the start position K4 to the end position K5.

identifier of a control resource set, a smallest identifier of a control resource set, a largest identifier of a control resource set, an identifier of a control resource set group, a smallest

TABLE 2

| Point A (K1) of a first serving cell | Start position of a BWP 1 (K2 = K1 + offset 1) | | | End position of the BWP 1 (K5 = K2 + bandwidth size) | |
|---|---|---|---|---|---|
| | Point A (K3) of a second serving call | Start position of a BWP 2 (K4 = K3 + offset 2) | | | End position of the BWP 2 (K6 = K4 + bandwidth size) |

When the terminal determines, as the indicated bandwidth resource, the intersection set of the bandwidth resources indicated by the plurality of pieces of bandwidth resource indication information, the network device receives feedback information of the terminal after indicating the bandwidth resource indication information (for example, indicating an ID of the BWP) to the terminal. A time at which the network device receives the feedback may be preset duration. In the preset duration, if the terminal feeds back a NACK, the network device considers that the bandwidth resource indicated by the network device is not used by the terminal as a bandwidth resource to which the terminal is to switch. In other words, the network device considers that the terminal is not to switch to the bandwidth resource indicated by the network device. Otherwise, the network device considers that the terminal is to switch to the bandwidth resource indicated by the network device.

Alternatively, in another implementation, when a plurality of network devices send a plurality of pieces of bandwidth resource indication information to the terminal by using downlink control signaling, if the plurality of pieces of bandwidth resource indication information are different, the terminal device uses one of the plurality of pieces of bandwidth resource indication information.

identifier of a control resource set group, a largest identifier of a control resource set group, an identifier of search space, a smallest identifier of search space, or a smallest identifier of a search space group corresponding to the downlink control signaling.

For example, if receiving a plurality of pieces of downlink control signaling in one time unit, the terminal device uses downlink control signaling corresponding to a smallest identifier or a largest identifier in identifiers of DCI corresponding to the downlink control signaling. For DCI that is different from a BWP switching indication complied with by the terminal device, the terminal device feeds back a negative acknowledgement (NACK) for the DCI. The identifier of the DCI may be an identifier of a CORESET or a CORESET group in which the DCI is located, an identifier of a search space group, or an identifier of search space.

In another implementation, the terminal selects a bandwidth resource that corresponds to a smallest bandwidth position in the bandwidth positions indicated by the plurality of pieces of bandwidth resource indication information, and determines the selected bandwidth resource as the indicated bandwidth resource.

TABLE 3

| Point A (K1) of a first serving cell | Start position of a BWP 1 (K2 = K1 + off set 1) | | | End position of the BWP 1 (K5 = K2 + bandwidth size) | |
|---|---|---|---|---|---|
| | Point A (K3) of a second serving cell | Start position of a BWP (K4 = K3 + offset 2) | | | End positio n of the BWP 2 (K6 = K4 + bandwidth size) |
| | Point A (K7) of a third serving cell | Start position of a BWP 3 (K8 = K7 + offset 2) | End position of the BWP 3 (K9 = K8 + bandwidth size) | | |

The terminal device determines, based on bandwidth resource indication information carried in downlink control signaling corresponding to a preset identifier, the indicated bandwidth resource. The preset identifier is a specified As shown in Table 3, bandwidth resources respectively indicated by bandwidth resource indication information carried in three pieces of downlink control signaling from the first serving cell, the second serving cell, and the third serving cell are the BWP 1, the BWP 2, and the BWP 3, and a bandwidth position of the BWP 3 of the third serving cell is the smallest in bandwidth positions of the BWP 1, the BWP 2, and the BWP 3. Therefore, the terminal uses the BWP 3 as the indicated bandwidth resource.

After selecting bandwidth resource indication information carried in one piece of downlink control signaling, and determining an indicated bandwidth resource, the terminal feeds back an acknowledgement (ACK) to a network device corresponding to the selected downlink control signaling.

Further, after feeding back a negative acknowledgement (NACK) for an indication of downlink control signaling other than the downlink control signaling selected by the terminal, the terminal may switch to the bandwidth resource corresponding to the complied bandwidth resource indication information. Therefore, a bandwidth resource switching time may be defined. The bandwidth resource switching time means that after receiving the downlink control signaling, the terminal starts switching after a predetermined time, a start position of the bandwidth resource needs to ensure that the terminal has completed feedback to another network device and completes the switching in another predetermined time, and an end position of the bandwidth resource needs to ensure that the network device knows that the terminal device has switched to the new bandwidth resource.

In addition to feeding back the NACK for the other downlink control signaling, the terminal may further feed back, for the other downlink control signaling, an identifier of the bandwidth resource, for example, an identifier of a BWP, to which the terminal device needs to switch or is to switch.

For example, the terminal device receives DCI 1 that indicates the BWP 1, the terminal device receives DCI 2 that indicates the BWP 2, and the DCI 1 and the DCI 2 are sent in a same time unit. If the terminal device determines, according to a preset rule, to switch to the BWP 1, the terminal device feeds back a NACK for scheduling of the DCI that is not complied with. The terminal device may further feed back, by using a feedback resource (a PUCCH/PUSCH) corresponding to the DCI 2, to a network device, for example, a TRP 2, corresponding to the DCI 2, so that the TRP 2 corresponding to the DCI 2 can receive feedback information. The feedback information includes information about the BWP 1 to which the terminal device is to switch. In this way, the TRP 2 learns that the BWP 2 indicated by the DCI 2 sent by the TRP 2 is not selected, and the TRP 2 may further learn that the terminal device is to switch to the BWP 1, or that the terminal device is to switch to the BWP 1 is indicated to the TRP 2.

Regardless of whether the terminal uses the same bandwidth resource sent through negotiation between the foregoing network devices, or the terminal uses only the bandwidth resource indicated by one of the plurality of pieces of bandwidth resource indication information, the network device finally needs to learn of a bandwidth resource that can be actually supported or used by the terminal. Herein, the bandwidth resource that can be actually supported or used by the terminal is defined as an actual bandwidth resource.

The terminal does not expect to receive a downlink signal (for example, a PDSCH, a PDCCH, or a CSI-RS) outside a frequency domain resource corresponding to the actual bandwidth resource. In other words, the terminal does not receive the downlink signal outside the frequency domain resource corresponding to the actual bandwidth resource.

Correspondingly, when scheduling a resource for the terminal, the network device may schedule a signal within an actual bandwidth resource range supported by the terminal or beyond the actual bandwidth resource range. However, the network device should know that when receiving a signal, the terminal can receive only a signal within the actual bandwidth resource range supported by the terminal, but cannot receive a signal beyond the actual bandwidth resource range.

Correspondingly, the terminal cannot transmit an uplink signal (for example, a PUSCH, a PUCCH, or an SRS) beyond the actual bandwidth resource range supported by the terminal. Therefore, when the network device schedules an uplink signal, a frequency domain resource of the scheduled uplink signal falls within the actual bandwidth resource range supported by the terminal, that is, does not beyond the actual bandwidth resource range.

If the BWP indicated by the bandwidth resource indication information is the same as the current active BWP, the terminal does not switch the BWP. In step 405, the terminal continues to perform uplink transmission based on an uplink transmission mode configuration in the current active BWP, and sends an SRS based on SRS configuration information.

Step 406: When the indicated bandwidth resource is different from a current active bandwidth resource, determine a currently active bandwidth resource based on an uplink transmission mode configuration status or a sounding reference signal configuration status on the indicated bandwidth resource.

It should be noted that the uplink transmission mode configuration status or the sounding reference signal configuration status on the indicated bandwidth resource is whether an uplink transmission mode or an SRS is configured on the indicated bandwidth resource, a quantity of uplink transmission modes or configured SRSs or a quantity of groups of uplink transmission modes or configured SRSs, or the like.

As described above, an uplink transmission mode (for example, a PUSCH transmission mode) or an SRS is independently configured in each BWP. Therefore, when receiving the bandwidth resource indication information of the network device, the terminal first needs to interpret the bandwidth resource indication information, determines, based on the uplink transmission mode configuration status or the sounding reference signal configuration status on the indicated bandwidth resource, whether the BWP indicated by the network device is set to the currently active BWP.

First, when the terminal does not expect that when the network device indicates BWP switching by using DCI, no uplink transmission mode is configured, for example, no PUSCH transmission mode or SRS is configured, in the indicated BWP, because if no PUSCH transmission mode or SRS is configured in the BWP, the network device is allowed to schedule the terminal only by using the DCI format 0_0.

However, in an actual implementation, when the network device indicates BWP switching by using the DCI, there are the following three configuration statuses of the uplink transmission mode or the sounding reference signal on the indicated bandwidth resource:

In a first case, no uplink transmission mode or sounding reference signal is configured on the indicated bandwidth resource. The first case specifically includes: no uplink transmission mode is configured; no SRS is configured; or the uplink transmission mode is configured, but no SRS is configured.

In a second case, an uplink transmission mode is configured on the indicated bandwidth resource, and one sounding reference signal is configured or one group of sounding reference signals are configured.

In a third case, an uplink transmission mode is configured on the indicated bandwidth resource, and at least two or at least two groups of sounding reference signals are configured.

For the three cases, this embodiment of the present invention provides different operation manners, so that the terminal can correctly parse the bandwidth resource indication information, to perform uplink transmission or SRS sending.

For the first case, that is, when no uplink transmission mode or SRS is configured in the BWP indicated by the bandwidth resource indication information received by the terminal, the terminal may have the following several processing manners:

1. The terminal ignores the bandwidth resource indication information in the following possible operation methods:
    considering, by the terminal, that the bandwidth resource indication information has not been received; or
    setting the bandwidth resource indication information to be invalid; or
    skipping processing the bandwidth resource indication information for uplink signal or channel transmission, or skipping parsing the bandwidth resource indication information; or
    parsing, by the terminal, the bandwidth resource indication information, but skipping processing content obtained through the parsing; or
    setting a value of the bandwidth resource indication information to another value, where the another value may be a null value, a zero value, or a value indicating that the bandwidth resource indication information is invalid.

In this way, the terminal does not set the indicated bandwidth resource as the currently active bandwidth resource.

2. The terminal continues to set the initial BWP or the first active BWP to the currently active BWP.

3. The terminal sends an uplink shared channel on the indicated bandwidth resource. Space domain information of the uplink shared channel is determined based on space domain information of an uplink control channel. The uplink control channel is a PUCCH, and space domain information of the PUCCH is specifically a beam. Optionally, the terminal may send a PUSCH on a beam that is of the PUCCH and whose index or identifier is the smallest.

4. The terminal sends an uplink shared channel on the current active bandwidth resource. Space domain information of the uplink shared channel is determined based on space domain information of an uplink control channel. Space domain information of a PUCCH is specifically a beam. Optionally, the terminal may send a PUSCH on a beam that is of the PUCCH and whose index or identifier is the smallest.

Further, the downlink control information further carries sounding reference signal request information, and the terminal ignores the sounding reference signal request information.

Specifically, the terminal may consider that the sounding reference signal request information has not been received; or
    set the sounding reference signal request information to be invalid, where a manner of setting the sounding reference signal request information to be invalid may be: setting each bit of an SRS request field indicating the sounding reference signal request information to zero or null, or another value indicating that the sounding reference signal request information is invalid; or
    skip processing the sounding reference signal request information for uplink signal or channel transmission, or skip parsing the sounding reference signal request information; or
    the terminal parses the sounding reference signal request information, but skips processing content obtained through the parsing.

Further, the downlink control information further carries sounding reference signal indication information, and the terminal ignores the sounding reference signal indication information.

Specifically, the terminal may consider that the sounding reference signal indication information has not been received; or may set the sounding reference signal indication information to be invalid, where a manner of setting the sounding reference signal indication information to be invalid may be setting each bit of an SRI field indicating the sounding reference signal indication information to zero or null, or another value indicating that the sounding reference signal indication information is invalid; or
    skip processing the sounding reference signal indication information for uplink signal or channel transmission, or skip parsing the sounding reference signal indication information; or
    the terminal parses the sounding reference signal indication information, but skips processing content obtained through the parsing.

Based on the foregoing descriptions, during CB based transmission, the SRI field in the DCI is $\lceil \log_2(N_{SRS}) \rceil$ bits, where $N_{SRS}$ is a quantity of SRS resources in a configured SRS resource set used for the CB based transmission; or during NCB based transmission, the SRI field in the DCI is $$\left\lceil \log_2\left( \sum_{k=1}^{\min\{L_{max}^{PUSCH}, N_{SRS}\}} \binom{N_{SRS}}{k} \right) \right\rceil$$

bits, where $N_{SRS}$ is a quantity of SRS resources in a configured SRS resource set used for the NCB based transmission, and $L_{max}^{PUSCH}$ is a maximum quantity of layers supported for PUSCH transmission.

When there is neither PUSCH configuration nor SRS configuration on the bandwidth resource indicated by the bandwidth resource indication information carried in the DCI sent by the network device to the terminal, regardless of a quantity of SRS resources or a specific SRS resource indicated by the SRI field in the DCI, the terminal ignores the SRS resource, or sets a quantity of bits of the SRI field carried in the DCI to 0, because in this case, no SRS resource is configured in the BWP indicated by the DCI.

Further, the terminal does not expect to receive transmission indication information that is sent by the network device and that indicates non-single-antenna transmission, or the terminal considers that single-antenna transmission is performed in the indicated BWP. Specifically, the terminal does not expect that antenna port indication information carried in the DCI sent by the network device to the terminal indicates more than one antenna port. In other words, regardless of whether the antenna port indication information indicates more than one antenna port, the terminal considers that there is one antenna port. In an implementation, the terminal uses the antenna port indicated by the antenna port indication information as a first antenna port, there is one first antenna port, and the first antenna port may be an antenna port with a predefined value, for example, an antenna port with a least significant bit, an antenna port with a most significant bit, or an antenna port corresponding to an antenna port number configured by using higher layer signaling.

Further, the terminal does not expect to receive information about non-single-antenna transmission that corresponds to precoding indication information that is sent by the network device by using the downlink control information, and the precoding indication information includes a transmission rank indication or a precoding matrix. Regardless of a value of a rank of the transmission rank indication, the terminal considers the value of the rank of the transmission rank indication as 1; or regardless of a dimension of the precoding matrix, the terminal considers the precoding matrix as a 1×1 dimensional matrix, and content of the matrix is [1].

Further, because no SRS resource is configured in the indicated BWP of the terminal in this case, the terminal does not expect that SRS request information sent by the network device to the terminal by using the downlink control information does not correspond to that no SRS is to be sent. In other words, the terminal expects that SRS request information sent by the network device to the terminal corresponds to that no SRS is to be sent. If the received SRS request information corresponds to that an SRS is to be sent, the terminal ignores the received SRS request information or considers each bit of an SRS request field indicating the SRS request information as 0.

The SRS request field may be X bits, and one value of the field is a state. For example, a first state indicates the terminal not to send an SRS, a second state indicates the terminal to send a first SRS, a third state indicates the terminal to send a second SRS, and a fourth state indicates the terminal to send a third SRS. In this case, the value should correspond to the first state.

For example, the SRS request field is two bits, 00 indicates that no SRS is to be sent, 01 indicates that the first SRS is to be sent, 10 indicates that the second SRS is to be sent, and 11 indicates that the third SRS is to be sent. In this case, if the terminal needs to be indicated not to send no sounding resource, the value of the SRS request field should be 00. Certainly, this is merely an example herein, and bit information indicating the terminal not to send the sounding resource may alternatively be in another form.

For the second case, the indicated BWP of the terminal has a PUSCH transmission mode configuration, but has only one SRS resource configuration.

Based on the foregoing descriptions, during CB based transmission, the SRI field in the DCI is $\lceil \log_2(N_{SRS}) \rceil$ bits, where $N_{SRS}$ is a quantity of SRS resources in a configured SRS resource set used for the CB based transmission; or during NCB based transmission, the SRI field in the DCI is $$\left\lceil \log_2\left( \sum_{k=1}^{\min\{L_{max}^{PUSCH}, N_{SRS}\}} \binom{N_{SRS}}{k} \right) \right\rceil$$

bits, where $N_{SRS}$ is a quantity of SRS resources in a configured SRS resource set used for the NCB based transmission, and $L_{max}^{PUSCH}$ is a maximum quantity of layers supported for PUSCH transmission.

In this case, because the indicated BWP has only one SRS resource, regardless of the CB based transmission or the NCB based transmission, the terminal should perform transmission based on the configured one SRS resource. Therefore, regardless of a quantity of SRS resources and a specific SRS resource indicated by the SRI field, the terminal considers that each information bit of the SRI field is useless, so that the terminal ignores the SRI field in the DCI; or does not parse the SRI field; or even if the terminal parses the SRI field, the terminal performs no processing on content obtained through the parsing. Alternatively, the terminal considers that a quantity of bits of the SRI field in the DCI is 0 or null, or another value indicating that the SRI field is invalid.

In this case, the terminal determines, based on the SRS resource configured in the indicated BWP, an SRS associated with a PUSCH to be transmitted.

The terminal determines that beam information of an indicated SRS may be a downlink beam (for example, a beam of an SSB or a CSI-RS) or an uplink beam (for example, a beam of another SRS) from the indicated BWP configured in the SRS, or a beam from another BWP or carrier configured in the SRS.

For the third case, the indicated BWP of the terminal has a PUSCH transmission mode configuration, and has a plurality of SRS resource configurations.

In this case, the terminal determines, based on the SRI field carried in the DCI, a beam for sending a PUSCH.

When the terminal interprets the SRI field in the DCI, if a quantity of bits required by the SRI field of the indicated BWP is greater than a quantity of bits of an SRI field in the current BWP, the terminal needs to perform a zero adding operation on the bit of the SRI field in the current DCI, until the quantity of bits of the SRI field is equal to the quantity of bits required by the SRI field of the indicated BWP.

If the quantity of bits of the SRI field of the indicated BWP is less than the quantity of bits of the SRI field in the DCI, the terminal ignores a high-order bit of the SRI field in the DCI, and reads only a low-order bit of the quantity of bits required by the indicated BWP.

Further, the terminal determines, based on the SRS configured in the indicated BWP, an SRS associated with the PUSCH to be transmitted. For example, if two SRSs are configured in the indicated BWP, and the SRI field in the DCI indicates a second SRS, the terminal determines that the second SRS is the second SRS in the two SRSs configured in the indicated BWP.

The terminal determines that beam information of the indicated SRS may be a downlink beam (for example, a beam of an SSB or a CSI-RS) or an uplink beam (for example, a beam of another SRS) from the indicated BWP configured in the SRS, or a beam from another BWP or carrier configured in the SRS.

In this case, in a case other than the first case, the terminal determines the PUSCH transmit beam and the SRS resource that are in the indicated BWP, sets the BWP indicated by the bandwidth resource indication information carried in the DCI as the currently active BWP, and sends the PUSCH on the currently active BWP.

During implementation of this embodiment of the present invention, on a side of the terminal, when receiving the bandwidth resource indication information sent by the network device by using the downlink control information, the terminal parses the downlink control information in an unambiguous parsing manner. In this way, the BWP is smoothly switched, and the uplink transmission is performed.

The present invention further provides a network device and a terminal, which are respectively configured to perform the method 300 for indicating bandwidth resource switching shown in FIG. 3 and the bandwidth resource switching method 400 shown in FIG. 4. The following describes the network device and the terminal device in detail.

Figure 5:
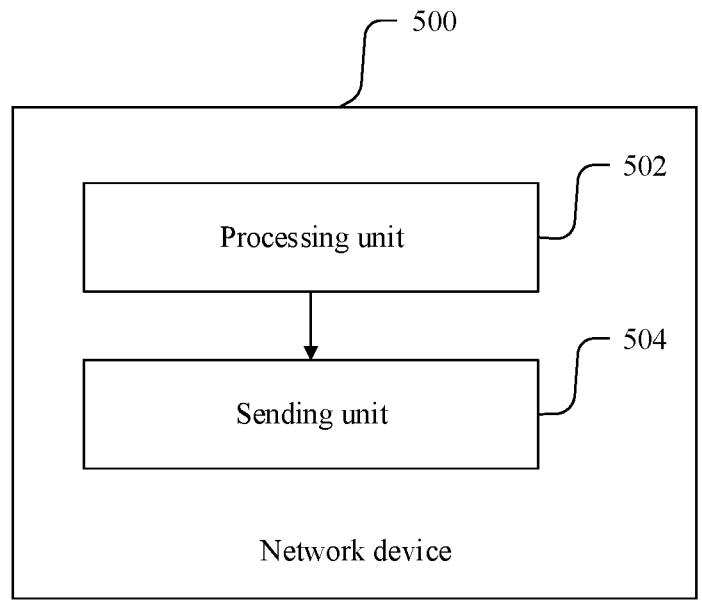
FIG. 5 is a schematic diagram of a logical structure of a network device according to an embodiment of the present invention.

FIG. 5 is a schematic diagram of a logical structure of a network device 500 according to an embodiment of the present invention. In a specific implementation process, the network device 500 may be but is not limited to, for example, the base stations 202 to 206 shown in FIG. 2. As shown in FIG. 5, the network device 500 includes a processing unit 502 and a sending unit 504.

In an implementation, the processing unit 502 is configured to configure bandwidth resource configuration information for a terminal, where the bandwidth resource configuration information carries an initial bandwidth resource or a first active bandwidth resource;

the sending unit 504 is configured to send the bandwidth resource configuration information to the terminal, and the sending unit 504 is further configured to send downlink control information to the terminal, where the downlink control information carries bandwidth resource indication information, and the bandwidth resource indication information is used to indicate an identifier of a bandwidth resource, to indicate the terminal to perform a bandwidth resource switching operation.

In another implementation, the network device further includes a receiving unit (not shown in the figure), configured to obtain bandwidth resource indication information carried in downlink control signaling sent by another network device to a terminal; or the sending unit 504 of the network device is configured to notify another network device of bandwidth resource indication information carried in downlink control signaling sent by the network device to a terminal; and the sending unit 504 is further configured to send the downlink control signaling to the terminal, where the downlink control signaling carries the bandwidth resource indication information, and a bandwidth resource indicated by the bandwidth resource indication information is the same as a bandwidth resource indicated by the bandwidth resource indication information carried in the downlink control signaling sent by the another network device to the terminal. Specifically, that bandwidth resources indicated by a plurality of pieces of bandwidth resource indication information sent by a plurality of network devices are the same may mean that the network devices in a plurality of intra-frequency cells or the network devices in a same cell send the plurality of pieces of bandwidth resource indication information, and the bandwidth resources indicated by the plurality of pieces of bandwidth resource indication information are the same; or the plurality of pieces of bandwidth resource indication information sent by the plurality of network devices in different cells or in inter-frequency cells after negotiation indicate frequency domain resources at a same bandwidth position.

A process in which the plurality of network devices send, to the terminal through negotiation, the bandwidth resource indication information indicating the frequency domain resources at the same bandwidth position is specifically:

The network devices exchange information, where the exchanged information includes the bandwidth resource indication information (for example, BWP indication information), and the network device further sends, to another network device, a time at which the bandwidth resource indication information is to be sent to the terminal. For example, the network devices negotiate with each other to send DCI in a time unit, for example, a slot n, to indicate a same bandwidth resource, for example, a BWP (y). Then, the network device sends the DCI based on the exchanged information, where the DCI carries the bandwidth resource indication information or further includes the time at which the bandwidth resource indication information is to be sent.

In still another implementation, the sending unit 502 is configured to send downlink control signaling to a terminal, and the downlink control signaling carries bandwidth resource indication information. Specifically, network devices exchange bandwidth resource configuration information configured by the network devices for the terminal, for example, BWP configuration information, which is specifically information such as a start position, an end position, and a size of a BWP. In this way, the network devices may determine actual available bandwidth resources based on bandwidth resource information that is to be indicated by the network devices, and then the network devices respectively indicate the actual available bandwidth resources to the terminal. The bandwidth resources respectively indicated by the plurality of network devices may not be completely the same; and the receiving unit is further configured to receive, from the terminal, an acknowledgement, a negative acknowledgement, or an identifier of a bandwidth resource to which the terminal is to switch.

The network device 500 is configured to perform the method 300 for indicating bandwidth resource switching shown in FIG. 3 and the bandwidth resource sending method in the method 300. Related technical features have been described in detail above with reference to the method 300 shown in FIG. 3. Therefore, details are not described herein again.

Figure 6:
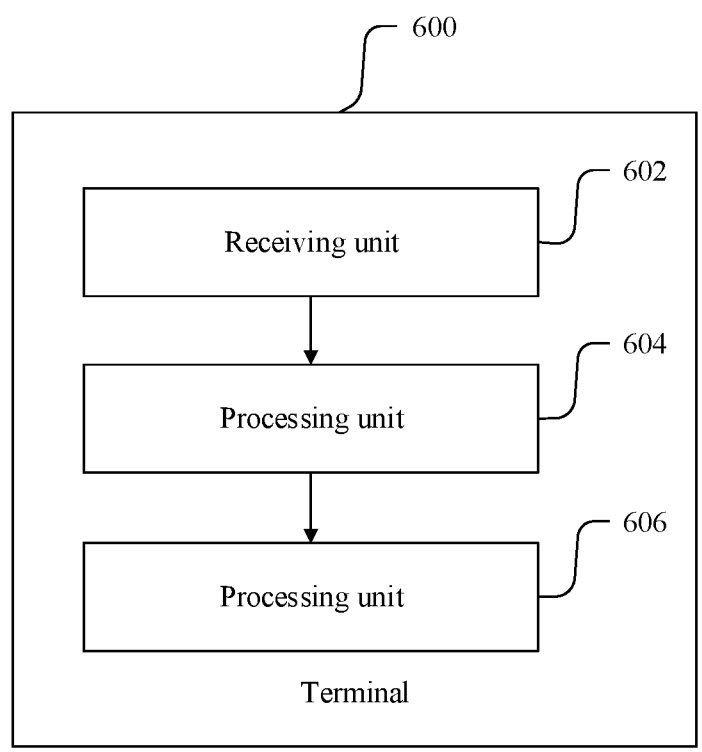
FIG. 6 is a schematic diagram of a logical structure of a terminal according to an embodiment of the present invention.

FIG. 6 is a schematic diagram of a logical structure of a terminal 600 according to an embodiment of the present invention. In a specific implementation process, the terminal 600 may be but is not limited to, for example, the terminals 208 to 222 shown in FIG. 2. As shown in FIG. 6, the terminal 600 includes a receiving unit 602 and a processing unit 604.

In an implementation, the receiving unit 602 is configured to receive downlink control information, where the downlink control information carries bandwidth resource indication information;

the processing unit 604 is configured to: determine an indicated bandwidth resource based on the bandwidth resource indication information; and when the indicated bandwidth resource is different from a current active bandwidth resource, determine a currently active bandwidth resource based on an uplink transmission mode configuration status or a sounding reference signal configuration status on the indicated bandwidth resource; and the terminal further includes a sending unit 606; and when no uplink transmission mode or sounding reference signal is configured on the indicated bandwidth resource, the sending unit 606 sends an uplink shared channel on the current active bandwidth resource; or the sending unit sends an uplink shared channel on the indicated bandwidth resource, where space domain information of the uplink shared channel is determined based on space domain information of an uplink control channel.

In another implementation, the receiving unit 602 is configured to receive a plurality of pieces of downlink control signaling, where the downlink control signaling carries bandwidth resource indication information, and bandwidth resources indicated by a plurality of pieces of bandwidth resource indication information are the same; and the processing unit 604 is configured to determine the indicated bandwidth resource based on the bandwidth resource indication information.

In still another implementation, the receiving unit 602 is configured to receive a plurality of pieces of downlink control signaling, where the downlink control signaling carries bandwidth resource indication information; and the processing unit 604 is configured to determine an indicated bandwidth resource based on the bandwidth resource indication information.

The terminal 600 is configured to perform the bandwidth resource switching method 400 shown in FIG. 4 and the bandwidth resource receiving method in the method 400. Related technical features have been described in detail above with reference to the method 400 shown in FIG. 4. Therefore, details are not described herein again.

Figure 7:
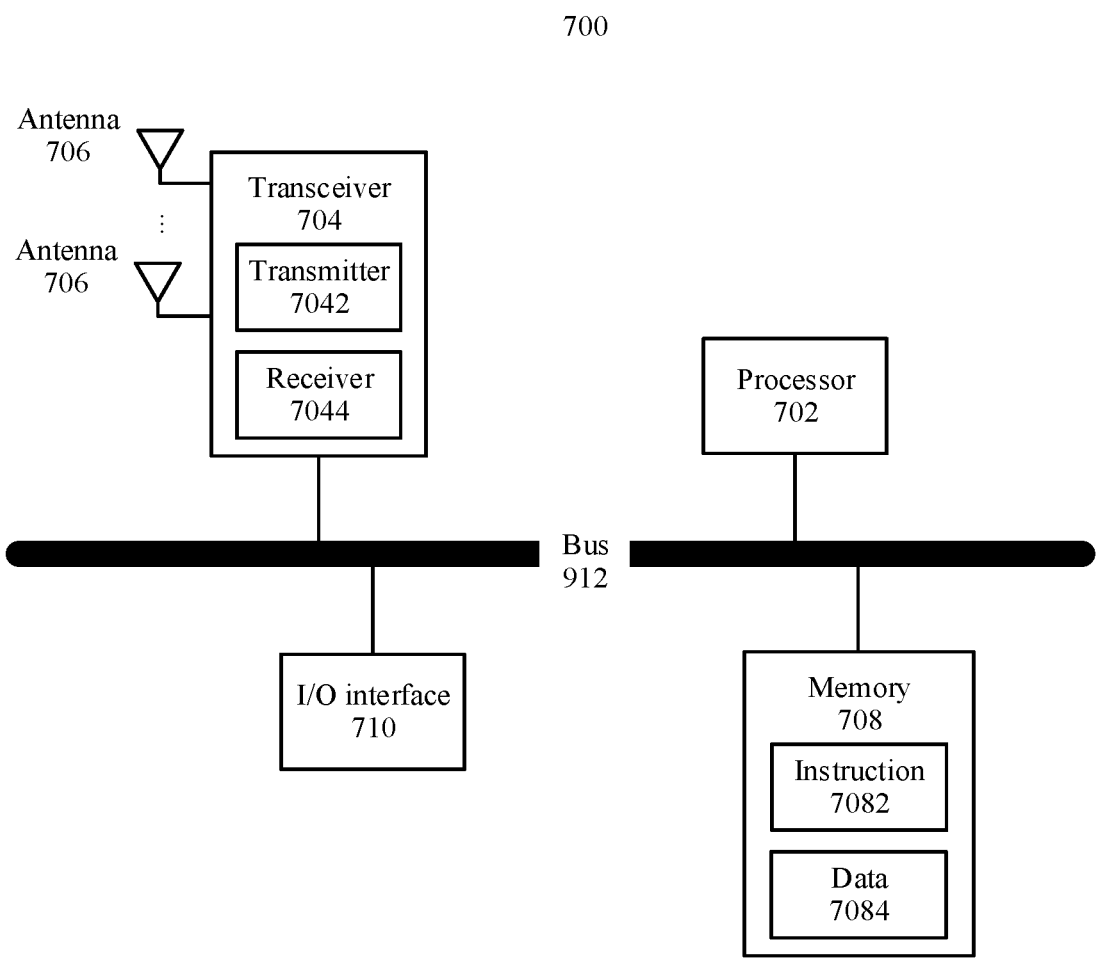
FIG. 7 is a schematic diagram of a hardware structure of a network device according to an embodiment of the present invention.

FIG. 7 is a schematic diagram of a hardware structure of a network device 700 according to an embodiment of the present invention. As shown in FIG. 7, the network device 700 includes a processor 702, a transceiver 704, a plurality of antennas 706, a memory 708, an I/O (Input/Output) interface 710, and a bus 712. The transceiver 704 further includes a transmitter 7042 and a receiver 7044, and the memory 708 is further configured to store an instruction 7082 and data 7084. In addition, the processor 702, the transceiver 704, the memory 708, and the I/O interface 710 are in communication connection with each other through the bus 712. The plurality of antennas 706 are connected to the transceiver 704.

The processor 702 may be a general purpose processor but is not limited to, for example, a central processing unit (CPU), or may be a dedicated processor but is not limited to, for example, a digital signal processor (DSP), an application-specific integrated circuit (ASIC), and a field programmable gate array (FPGA). In addition, the processor 702 may alternatively be a combination of a plurality of processors. Particularly, in the technical solutions provided in the embodiments of the present invention, the processor 702 may be configured to perform, for example, step 302 in the method 300 shown in FIG. 3 and an operation performed by the processing unit 502 of the network device 500 shown in FIG. 5. The processor 702 may be a processor specifically designed for performing the foregoing steps and/or operations, or may be a processor that performs the foregoing steps and/or operations by reading and executing the instruction 7082 stored in the memory 708. The processor 702 may need to use the data 7084 in a process of performing the foregoing steps and/or operations.

The transceiver 704 includes the transmitter 7042 and the receiver 7044. The transmitter 7042 is configured to send a signal through at least one of the plurality of antennas 706. The receiver 7044 is configured to receive a signal through at least one of the plurality of antennas 706. Particularly, in the technical solutions provided in the embodiments of the present invention, the transmitter 7042 may be specifically configured to perform, through at least one of the plurality of antennas 706, for example, step 304 in the method 300 shown in FIG. 3 and an operation performed by the sending unit 504 of the network device 500 shown in FIG. 5.

The memory 708 may be various types of storage media, for example, a random access memory (RAM), a read-only memory (ROM), a non-volatile RAM (NVRAM), a programmable ROM (PROM), an erasable PROM (EPROM), an electrically erasable PROM (EEPROM), a flash memory, an optical memory, and a register. The memory 708 is specifically configured to store the instruction 7082 and the data 7084. The processor 702 may perform the foregoing steps and/or operations by reading and executing the instruction 7082 stored in the memory 708, and may need to use the data 7084 in a process of performing the foregoing steps and/or operations.

The I/O interface 710 is configured to receive an instruction and/or data from a peripheral device, and output an instruction and/or data to the peripheral device.

It should be noted that in a specific implementation process, the network device 700 may further include other hardware components, which are not enumerated in this specification.

Figure 8:
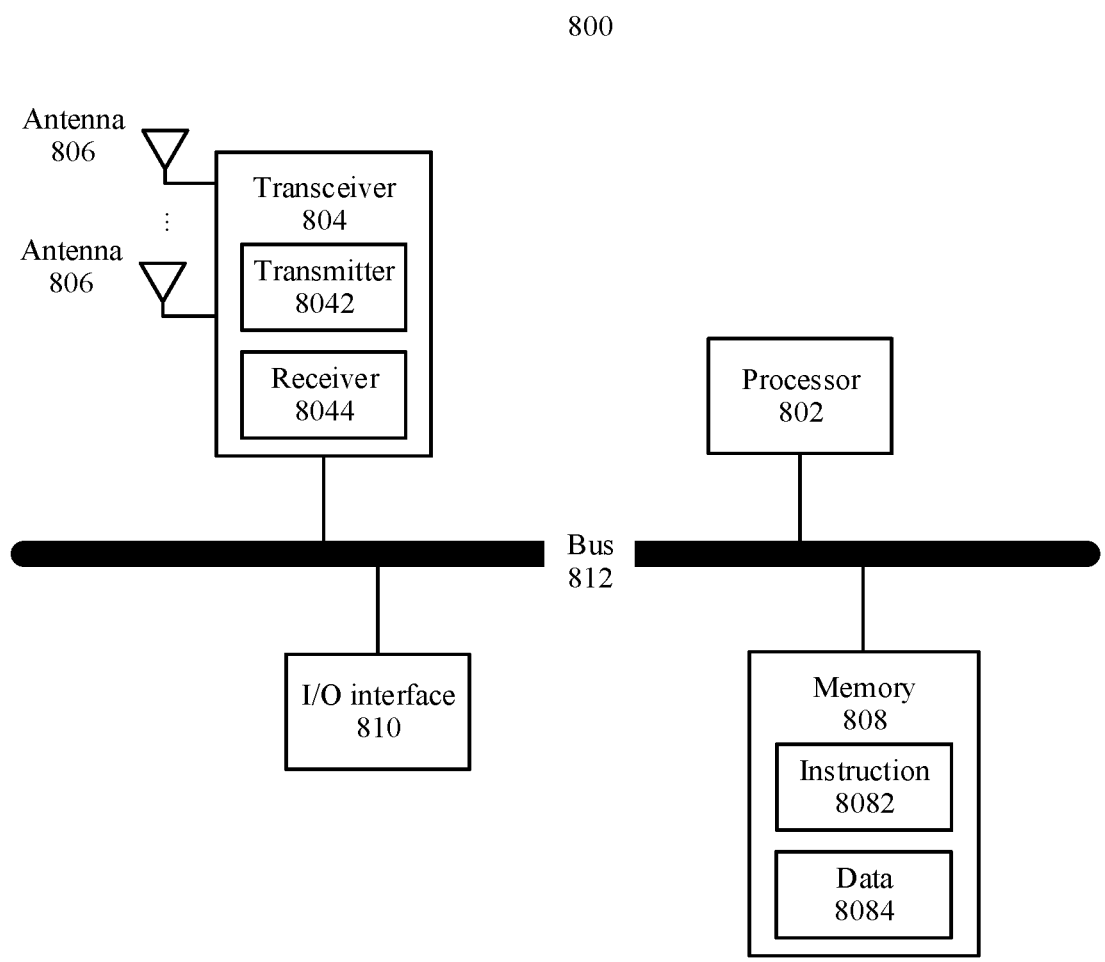
FIG. 8 is a schematic diagram of a hardware structure of a terminal according to an embodiment of the present invention.

FIG. 8 is a schematic diagram of a hardware structure of a terminal 800 according to an embodiment of the present invention. As shown in FIG. 8, the terminal 800 includes a processor 802, a transceiver 804, a plurality of antennas 806, a memory 808, an I/O (Input/Output) interface 810, and a bus 812. The transceiver 804 further includes a transmitter 8042 and a receiver 8044. The memory 808 is further configured to store an instruction 8082 and data 8084. In addition, the processor 802, the transceiver 804, the memory 808, and the I/O interface 810 are in communication connection with each other through the bus 812. The plurality of antennas 806 are connected to the transceiver 804.

The processor 802 may be a general purpose processor but is not limited to, for example, a central processing unit (CPU), or may be a dedicated processor but is not limited to, for example, a digital signal processor (DSP), an application-specific integrated circuit (ASIC), and a field programmable gate array (FPGA). In addition, the processor 802 may alternatively be a combination of a plurality of processors. Particularly, in the technical solutions provided in the embodiments of the present invention, the processor 802 may be configured to perform, for example, step 404 in the method 400 shown in FIG. 4 and an operation performed by the processing unit 604 of the terminal 600 shown in FIG. 6. The processor 802 may be a processor specifically designed for performing the foregoing steps and/or operations, or may be a processor that performs the foregoing steps and/or operations by reading and executing the instruction 8082 stored in the memory 808. The processor 802 may need to use the data 8084 in a process of performing the foregoing steps and/or operations.

The transceiver 804 includes the transmitter 8042 and the receiver 8044. The transmitter 8042 is configured to send a signal through at least one of the plurality of antennas 806. Particularly, in the technical solutions provided in the embodiments of the present invention, the transmitter 8042 is specifically configured to perform, through at least one of the plurality of antennas 806, an operation performed by the sending unit 606 of the terminal 600 shown in FIG. 6. The receiver 8044 is configured to receive a signal through at least one of the plurality of antennas 806. Particularly, in the technical solutions provided in the embodiments of the present invention, the receiver 8044 is specifically configured to perform, through at least one of the plurality of antennas 806, step 402 in the method 400 shown in FIG. 4 and an operation performed by the receiving unit 602 of the terminal 600 shown in FIG. 6.

The memory 808 may be various types of storage media, for example, a random access memory (RAM), a read-only memory (ROM), a non-volatile RAM (NVRAM), a programmable ROM (PROM), an erasable PROM (EPROM), an electrically erasable PROM (EEPROM), a flash memory, an optical memory, and a register. The memory 808 is specifically configured to store the instruction 8082 and the data 8084. The processor 802 may perform the foregoing steps and/or operations by reading and executing the instruction 8082 stored in the memory 808, and may need to use the data 8084 in a process of performing the foregoing steps and/or operations.

The I/O interface 810 is configured to: receive an instruction and/or data from a peripheral device, and output an instruction and/or data to the peripheral device.

It should be noted that in a specific implementation process, the terminal 800 may further include other hardware components, which are not enumerated in this specification.

The technical solutions provided in the embodiments of the present invention may be implemented by using a processor and a transceiver, the processor is configured to perform various processing operations but are not limited to, for example, operations such as generating, determining, judging, searching, extracting, obtaining, reading, and receiving input to-be-processed data and outputting processed data, and the transceiver is configured to perform operations such as transmitting and receiving. In a specific implementation process, the processor may be implemented in the following manners.

In a first case, the processor is a special purpose processor. In this case, the processor may further include an interface circuit and a processing circuit. The interface circuit is configured to: receive data that needs to be processed by the processing circuit, and output a processing result of the processing circuit. The processing circuit is configured to perform the foregoing processing operations.

In a second manner, the processor is implemented by using an architecture of a general purpose processor and a memory. The general purpose processor is configured to execute processing instructions stored in the memory, and the processing instructions are used to indicate the general purpose processor to perform the foregoing processing operations. It is not difficult to understand that the processing performed by the general purpose processor depends on the processing instructions stored in the memory. By modifying the processing instructions in the memory, the general purpose processor may be controlled to output different processing results.

Further, in the second manner, the general purpose processor and the memory may be integrated on a same chip. For example, both the general purpose processor and the memory may be integrated on a processing chip. In addition, the general purpose processor and the memory may alternatively be disposed on different chips. For example, the general purpose processor is disposed on a processing chip, and the memory is disposed on a storage chip.

The technical solutions provided in the embodiments of the present invention may alternatively be implemented by using a computer-readable storage medium, and the computer-readable storage medium stores a processing instruction for implementing the technical solutions of the embodiments of the present invention. The instruction is provided to be read by a general purpose processing device, to complete the technical solutions provided in the embodiments of the present invention. The foregoing general purpose processing device should be understood as a processing device that includes necessary hardware components such as a processor and a transceiver. Operations of the hardware components depend on the processing instruction stored in the computer-readable storage medium.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions according to the embodiments of the present invention are generated. The computer may be a general purpose computer, a special purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

In conclusion, the foregoing descriptions are merely embodiments of the present invention, but are not intended to limit the protection scope of the present invention. Any modification, equivalent replacement, or improvement made within the principle of the present invention shall fall within the protection scope of the present invention.

What is claimed is:

1. A bandwidth resource receiving method comprising:
receiving, by a terminal, a plurality of pieces of downlink control signaling from a plurality of network devices, wherein each piece of downlink control signaling of the plurality of pieces of downlink control signaling carries bandwidth resource indication information, and bandwidth resources indicated by a plurality of pieces of bandwidth resource indication information are the same;
determining, by the terminal, an indicated bandwidth resource based on the bandwidth resource indication information; and
wherein the bandwidth resources are bandwidth parts (BWPs).

2. The bandwidth resource receiving method according to claim 1, wherein the plurality of pieces of downlink control signaling are sent by using a same frequency domain resource.

3. The bandwidth resource receiving method according to claim 1, wherein each of the bandwidth resource indicated by the plurality of pieces of bandwidth resource indication information correspond to numerology wherein the numerology comprises a subcarrier spacing.

4. The bandwidth resource receiving method according to claim 1, wherein each of the bandwidth resources indicated by the plurality of pieces of bandwidth resource indication information correspond to a same subcarrier spacing.

5. A terminal comprising:
a transceiver, configured to cooperate with a processor to receive a plurality of pieces of downlink control signaling from a plurality of network devices, wherein each piece of downlink control signaling of the plurality of pieces of downlink control signaling carries bandwidth resource indication information, and bandwidth resources indicated by a plurality of pieces of bandwidth resource indication information are the same;

the processor, configured to determine an indicated bandwidth resource based on the bandwidth resource indication information; and wherein the bandwidth resources are bandwidth parts (BWPs).

6. The terminal according to claim 5, wherein the plurality of pieces of downlink control signaling are sent by using a same frequency domain resource.

7. The terminal according to claim 5, wherein each of the bandwidth resource indicated by the plurality of pieces of bandwidth resource indication information correspond to numerology, wherein the numerology comprises a subcarrier spacing.

8. The terminal according to claim 5, wherein each of the bandwidth resources indicated by the plurality of pieces of bandwidth resource indication information correspond to a same subcarrier spacing.

9. A network device comprising:

a processor and a transceiver, which is configured to cooperate with the processor to obtain bandwidth resource indication information carried in a plurality of pieces of downlink control signaling sent by another network device to a terminal; or send, the downlink control signaling to the terminal; and notify, the another network device of bandwidth resource indication information carried in the downlink control signaling sent by the network device to the terminal;

wherein the transceiver is further configured to cooperate with the processor to send the downlink control signaling to the terminal, wherein each piece of downlink control signaling of the plurality of pieces of downlink control signaling carries the bandwidth resource indication information, and a bandwidth resource indicated by a plurality of pieces of the bandwidth resource indication information is the same as a bandwidth resource indicated by the bandwidth resource indication information carried in the downlink control signaling sent by the another network device to the terminal, wherein the bandwidth resources are bandwidth parts (BWPs).

10. The network device according to claim 9, wherein a plurality of pieces of downlink control signaling are sent by using a same frequency domain resource.

11. The network device according to claim 9, wherein each of the bandwidth resource indicated by the plurality of pieces of bandwidth resource indication information correspond to numerology, wherein the numerology comprises a subcarrier spacing.

12. The network device according to claim 9, wherein each of the bandwidth resources indicated by the plurality of pieces of bandwidth resource indication information correspond to a same subcarrier spacing.

* * * * *